United States Patent
Massa et al.

(10) Patent No.: US 12,090,505 B2
(45) Date of Patent: *Sep. 17, 2024

(54) APPARATUS AND METHODS FOR DISPENSING AND FOAMING OF A PRODUCT

(71) Applicant: FrieslandCampina Nederland B.V., Amersfoort (NL)

(72) Inventors: Mark Robert René Massa, Wageningen (NL); Marc Jacques Christian Maurice Custinne, Wageningen (NL); Arno Fraiponts, Wageningen (NL); Joren Sweeck, Wageningen (NL)

(73) Assignee: FrieslandCampina Nederland B.V., Amersfoort (NL)

(*) Notice: Subject to any disclaimer, the term of this patent is extended or adjusted under 35 U.S.C. 154(b) by 0 days.

This patent is subject to a terminal disclaimer.

(21) Appl. No.: 18/080,339

(22) Filed: Dec. 13, 2022

(65) Prior Publication Data

US 2023/0226566 A1     Jul. 20, 2023

Related U.S. Application Data

(62) Division of application No. 16/763,191, filed as application No. PCT/NL2018/050769 on Nov. 16, 2018, now Pat. No. 11,596,957.

(30) Foreign Application Priority Data

Nov. 17, 2017  (NL) .................................. 2019935

(51) Int. Cl.
*B05B 7/24*     (2006.01)
*A47J 43/12*    (2006.01)
(Continued)

(52) U.S. Cl.
CPC .......... *B05B 7/2421* (2013.01); *A47J 43/125* (2013.01); *B05B 7/0037* (2013.01);
(Continued)

(58) Field of Classification Search
CPC ... B05B 7/2421; B05B 7/0037; B05B 7/1245; B05B 7/241; B05B 7/2427;
(Continued)

(56) References Cited

U.S. PATENT DOCUMENTS 3,633,795 A   11/1972  Brooks et al.
4,222,525 A    9/1980  Hildebrandt
(Continued)

FOREIGN PATENT DOCUMENTS

CA       2299598 A1 *   8/2000
CN       1332691 A       1/2002
(Continued)

OTHER PUBLICATIONS

Extended European Search Report for EP23197989.9 dated Jul. 9, 2024 (11 pages).

*Primary Examiner* — Bob Zadeh
(74) *Attorney, Agent, or Firm* — Foley & Lardner LLP

(57) ABSTRACT

A portable apparatus for dispensing and foaming of a product, including: a product container which contains a product that is to be foamed by and dispensed from the apparatus; a gas container, at least containing a gas, for example a single gas or a gas mixture, wherein the gas substantially does not contain any greenhouse gases such as N20; a dispersion device, having a product entrance that is connectable to the product container for receiving product, the dispersion device further being connectable to the gas container for supplying the gas to the product during product discharge; a processing device downstream of the dispersion device for performing a mixing treatment and/or pressure (Continued)

reduction on the product provided with the gas; and a product dispensing head, being part of a top section of the apparatus and being arranged downstream of the processing device.

20 Claims, 26 Drawing Sheets

(51) Int. Cl.
| | |
|---|---|
| B05B 7/00 | (2006.01) |
| B05B 7/12 | (2006.01) |
| B65D 83/14 | (2006.01) |
| B65D 83/42 | (2006.01) |
| B65D 83/62 | (2006.01) |
| B65D 83/66 | (2006.01) |

(52) U.S. Cl.
 CPC ............ *B05B 7/1245* (2013.01); *B05B 7/241* (2013.01); *B05B 7/2427* (2013.01); *B05B 7/2481* (2013.01); *B65D 83/42* (2013.01); *B65D 83/62* (2013.01); *B65D 83/663* (2013.01); *B65D 83/752* (2013.01)

(58) Field of Classification Search
 CPC ... B05B 7/2481; B05B 7/2416; B05B 7/1209; A47J 43/125; A47J 43/12; B65D 83/42; B65D 83/62; B65D 83/663; B65D 83/752; B65D 83/66
 See application file for complete search history.

(56) References Cited

U.S. PATENT DOCUMENTS

| | | |
|---|---|---|
| 4,262,848 A | 4/1981 | Chabria |
| 4,936,511 A * | 6/1990 | Johnson ................. B05B 15/30 222/464.5 |
| 5,046,667 A | 9/1991 | Fuhrig |
| 5,163,584 A | 11/1992 | Huber et al. |
| 5,893,486 A * | 4/1999 | Wasmire ............... B05C 17/015 366/101 |
| 5,924,599 A * | 7/1999 | Brown .................. B05B 7/2472 222/402.15 |
| 9,079,197 B2 | 7/2015 | Bina et al. |
| 11,596,957 B2 * | 3/2023 | Massa ................... A47J 43/125 |
| 2003/0150872 A1 * | 8/2003 | Huber ................... B05B 7/0408 222/145.5 |
| 2005/0258192 A1 | 11/2005 | Matthews et al. |
| 2010/0132626 A1 * | 6/2010 | Torgerson ................ A01J 7/04 137/15.01 |
| 2011/0127354 A1 | 6/2011 | Cubero |
| 2011/0210184 A1 | 9/2011 | Maas et al. |
| 2012/0042826 A1 * | 2/2012 | Galvin ................ B32B 37/1284 118/612 |
| 2017/0217665 A1 | 8/2017 | Clauwaert et al. |
| 2020/0360946 A1 | 11/2020 | Massa et al. |
| 2023/0226566 A1 * | 7/2023 | Massa ................... A47J 43/125 222/399 |

FOREIGN PATENT DOCUMENTS

| | | |
|---|---|---|
| CN | 1338339 A | 3/2002 |
| EP | 0 990 412 A2 | 4/2000 |
| EP | 1 256 299 A2 | 11/2002 |
| EP | 2 255 886 A1 | 12/2010 |
| EP | 2 660 188 A1 | 11/2013 |
| JP | 62-110177 U | 5/1987 |
| JP | U62-110177 | 7/1987 |
| JP | 2761519 B2 | 6/1998 |
| JP | 2006-206114 A | 8/2006 |
| JP | 2012-110799 A | 6/2012 |
| JP | 2023-129467 A | 9/2023 |
| KR | 1020130005798 A | 1/2013 |
| KR | 1020140091930 A | 7/2014 |
| WO | WO-2008/033005 A1 | 3/2008 |
| WO | WO-2009/110794 A | 9/2009 |
| WO | WO-2011/028117 A1 | 3/2011 |
| WO | WO-2015/008250 A2 | 1/2015 |
| WO | WO-2017/002630 A1 | 1/2017 |

* cited by examiner

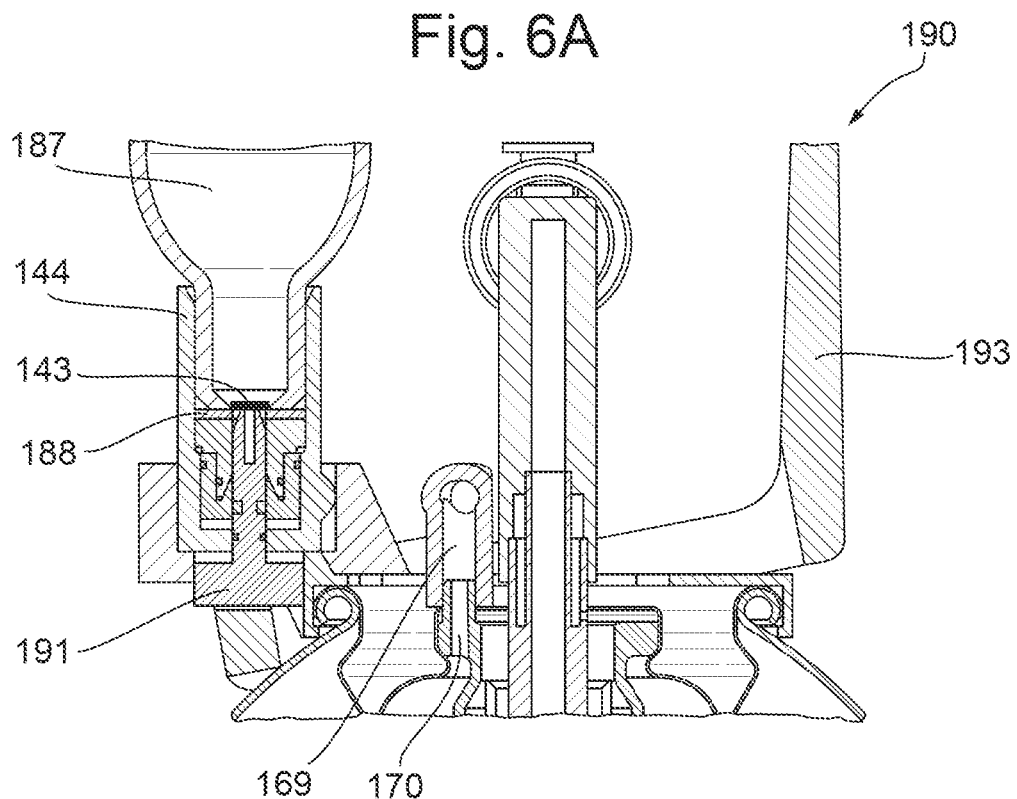
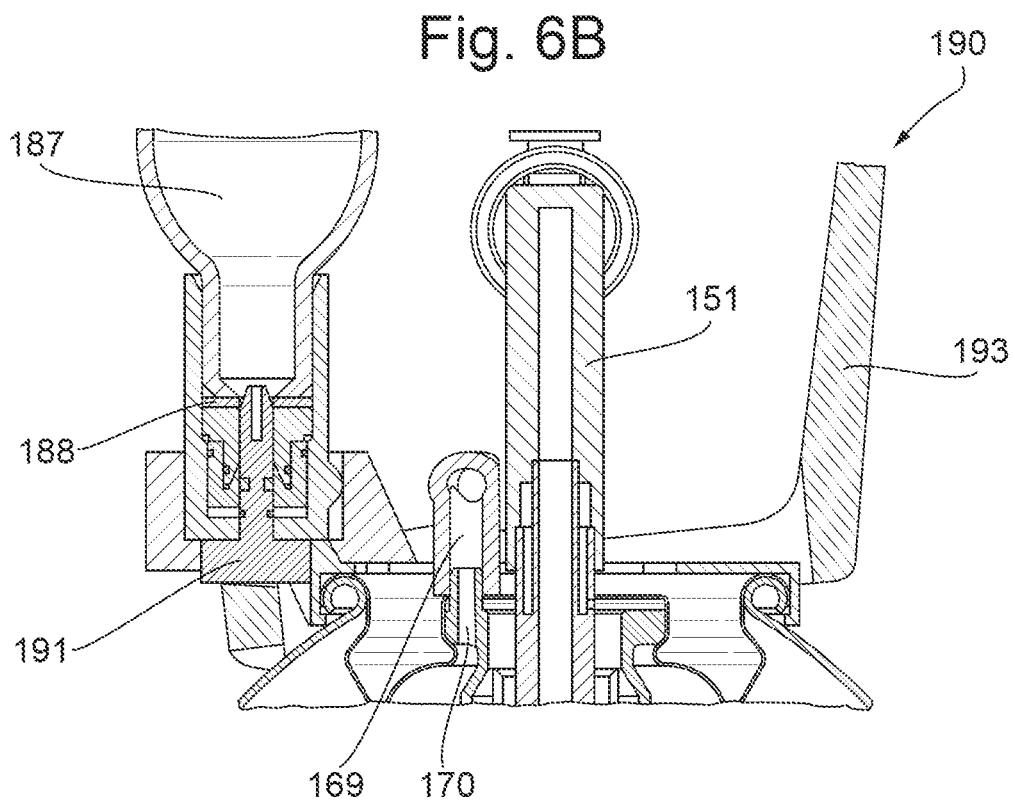

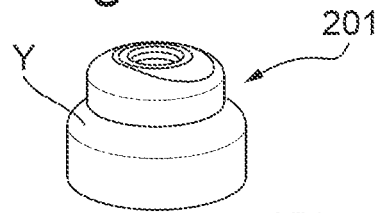
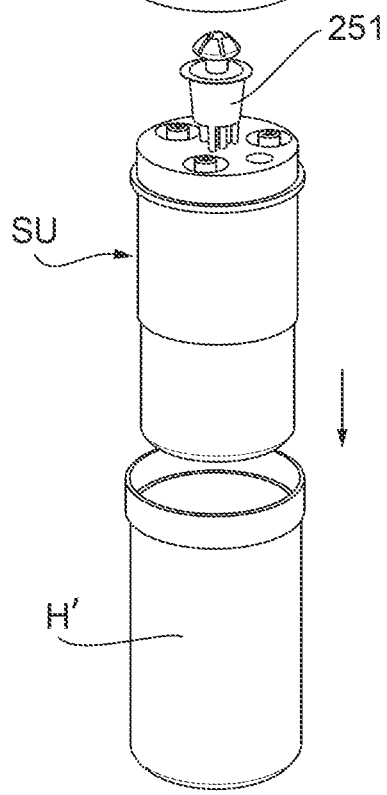
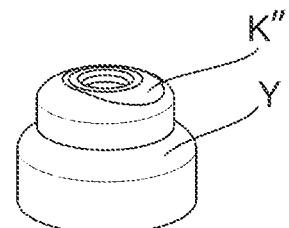
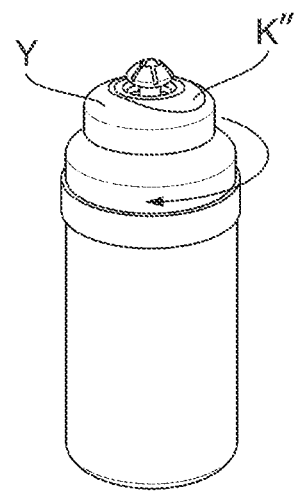
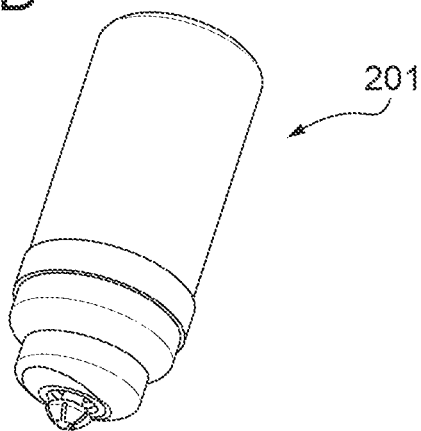

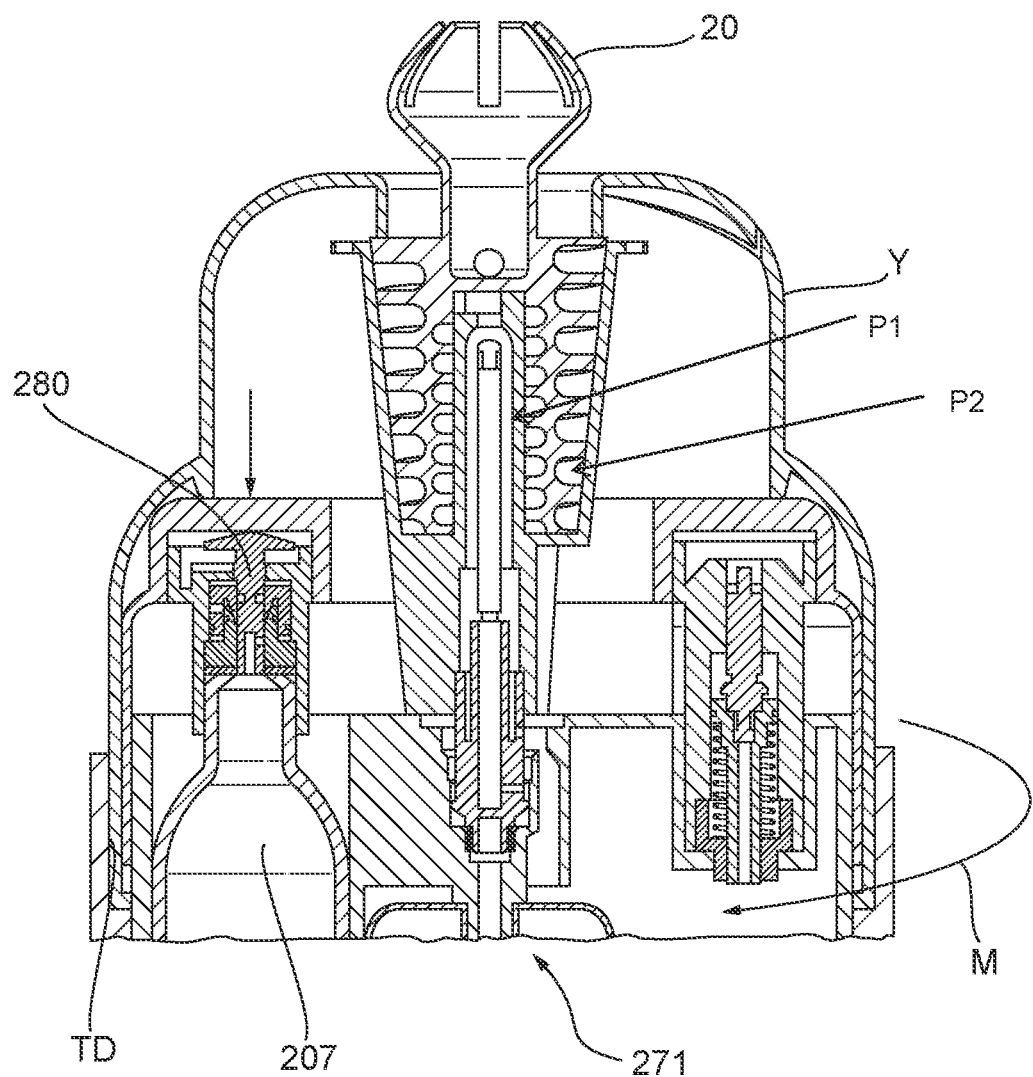

APPARATUS AND METHODS FOR DISPENSING AND FOAMING OF A PRODUCT

CROSS-REFERENCE TO RELATED APPLICATIONS

This application is a divisional of U.S. patent application Ser. No. 16/763,191, filed May 11, 2020, which was the National Stage of International Application No. PCT/NL2018/050769 filed Nov. 16, 2018, which claims priority to and benefit of Netherlands Patent Application No. 2019935 filed Nov. 17, 2017, all of which are hereby incorporated herein by reference in their entireties.

BACKGROUND

The invention concerns a portable apparatus for dispensing (and foaming) of a product.

An example of a known product dispensing and foaming apparatus is an aerosol can, see e.g. WO2008/033005. The known apparatus includes a reservoir containing a propellant and a foodproduct, operable discharge means to discharge the foodproduct, as well as a dispensing head defining a foodproduct receiving space to receive the foodproduct from the discharge means. A distal part of the head includes foodproduct shaping projections, for shaping of the outflowing foamed product.

The known apparatus is convenient, lightweight, compact and designed to be disposed after being used-up. This has major advantages over e.g. commercially available, bulky and expensive cream whipping machines (usually having an electrically driven pump, and requiring regular maintenance and cleansing operations).

Particularly, during operation of the known aerosol container, in case of operating the discharge means, cream is ejected via the dispensing head and undergoes a so called 'overrun' (i.e. volume increase), such that a 'spray cream' which resembles common whipped cream, is obtained.

The foodproduct is safe for consumption. As a non limiting example, the known aerosol container can be packed with foodproduct and propellant, the initial pressure in the container being for example in the range of 7-18 atmospheres, depending on the amount of packed foodproduct, as will be appreciated by the skilled person. The propellant of the known apparatus can consist of one or more gases acceptable from the viewpoint of food technology, for example a gas which substantially dissolves in the foodproduct, a gas which substantially does not dissolve in the foodproduct and a combination of these gases. Particularly, according to WO'005 the propellant can comprise $CO_2$, nitrogen (N2), laughing gas (N2O) or a combination of these gases (such as nitrogen and laughing gas). For example, 15-25 w % (weight %) of the propellant can be N2 and the remainder of the propellant (i.e. 85-75 w %) can be N2O.

In practice, the aerosol container at least comprises N2O as a propellant since this gas can provide good foodproduct propelling and foodproduct-overrun results, at the aforementioned pressures. One problem is that N2O is a so-called greenhouse gas. There is a general desire to limit or ban the use of green-house gases to protect the earth from global heating.

SUMMARY

The present invention aims to solve or alleviate this problem. In particular, the invention aims to provide an apparatus according to the preamble that can provide good foaming results in an environment-friendly and hygienic manner. Also, the invention aims to provide an apparatus that is user friendly, can be capable of dispensing product in different directions, and that can be manufactured in an economical manner.

According to an aspect of the invention this can be achieved by the features of claim 1.

Advantageously, there is provided an apparatus including:
- a product container which contains a product that is to be foamed by and dispensed from the apparatus;
- a gas container, at least containing a gas, for example a single gas or a gas mixture, wherein the gas substantially does not contain any greenhouse gases such as N2O;
- a dispersion device, having a product entrance that is connectable to the product container for receiving product, the dispersion device further being connectable to the gas container for supplying the gas to the product during product discharge;
- a processing device downstream of the dispersion device for performing a mixing treatment and/or pressure reduction on the product provided with the gas; and
- a product dispensing head, being part of a top section of the apparatus and being arranged downstream of the processing device, the dispensing head defining a product receiving space to receive the product from the processing device, a distal part of the dispensing head, preferably having product shaping projections,
- wherein the apparatus is configured to be used at least in a substantially upside-down orientation during product discharge.

It has been found that in this way, good product foaming (and subsequent shaping) can be achieved by a portable product dispensing apparatus. The apparatus can be made relatively compact and lightweight (e.g. having a maximum mass of about 1 kg and a maximum internal volume of about 1 liter), so that it can be used in the same way as e.g. prior art aerosol cans in a substantially upside-down orientation to eject the product in a substantially downward dispensing direction (e.g. towards or onto a product receiver or product receiving surface). The product foaming can be achieved in a hygienic manner as well. It should be noted that such a dispensing direction, achieved by the apparatus during operation, can be vertically downwards or a direction that includes a certain angle with a vertical plane (e.g. an angle in the range of 0-90 degrees). Similarly, a substantially upside-down orientation of the apparatus should be interpreted broadly, as will be appreciated by the skilled person.

A basis idea of the invention is the application of a dispersion device as part of the apparatus, which is found to provide good and stable foodproduct foaming, when the apparatus is held in the substantially upside-down orientation. The dispersion device can be configured in various different ways. For example, the dispersion device can be a gas entrainment and/or filtration device, and/or it can include a porous element or porous mass, or a different dispersion device.

Good results can be achieved in case the dispersion device is a microfiltration or an ultrafiltration device. In an embodiment, the dispersion device can be provided with a wall with gas transmissive pores having a pore size in the range of 0.1-200 microns, in particular a pore size of at least 0.1 micron and less than 5 microns. It has appeared that use of such a dispersion device can provide a highly stable, attractive foam, in particular of constant quality, in a relatively simple and economical manner. With various foamable products, moreover, a particularly high overrun (degree of aeration) has thus been found to be obtained, at any rate, a good overrun that is comparable to or higher than the overrun obtained with methods already known. A minimum overrun can be, for instance, approximately 100%, in particular approximately 150% and more particularly approximately 200% (depending on the product and the use). Moreover, a good end-product stability (i.e. sustaining a shape of the foamed product over time) can be achieved.

The dispersion device can include a gas dispersion wall having different configurations, and, for instance, be a tubular (e.g. microfiltration) wall, which separates a tube inner space from a tube outer space. In another embodiment, the dispersion device is provided with, for instance, a flat gas dispersion wall (e.g., sheet or membrane wall), with the product being passed on one side of the wall along this wall (through a first space as mentioned) and the gas on the other side (to a second space as mentioned), such that the gas is injected into the product via the gas dispersion wall (in particular via pores comprised by this wall).

The product formed by the invention can moreover provide a particularly pleasant taste sensation if the product is intended for consumption. Furthermore, it has been found that the dispersion device can be made relatively compact for good integration in the dispensing apparatus, and can still effect foam formation with high quality foam.

For example, an integrated microdispersion device can be designed in various manners. In particular, this device can comprise a rigid wall, which separates a product feed through space (for feeding-through the product) from a gas supply space. The gas dispersion wall is preferably provided with a large number of flow-through channels (extending, for instance, transversely through this wall, from the gas supply space to the product feed-through space), which channels are at least provided with relatively narrow outflow mouths (the channels can each also be narrow channels, but this is not requisite). In particular, the gas dispersion wall is so rigid that the wall does not deform under the influence of any pressure difference that may prevail during use between the product feed-through space and gas supply space, for instance, a pressure difference lower than 1 bar the pressures mentioned in this application are absolute pressures).

According to a further elaboration, the product that is dispensed by the apparatus can be a homogeneously foamed product (which may or may not be a monodisperse product foam).

According to a further elaboration, the apparatus can be designed such that downstream of the dispersion device, the product preferably undergoes a controlled pressure reduction. Here, the pressure of the product can in particular be gradually brought from a first pressure value to a second pressure value, with the first pressure value being higher than the second pressure value (a pressure difference between the first and second pressure can comprise, for instance, more than 1 bar, for example in the range of about 2-10 bar, in particular about 4-5 bar, or another pressure difference. The first pressure may be, for instance, superatmospheric. The second pressure may be, for instance, substantially atmospheric pressure.

The pressure reduction can be effected, for instance, by a product processing device suitable for that purpose (i.e., a pressure reducer, pressure decreasing device). The processing device can be configured for, for instance, applying shear to the flowing product for the purpose of decreasing the pressure.

As a gradual pressure reduction is applied, with shear being applied to the product in a controlled manner, separation of the product can be well prevented or limited.

It has been found that good results are obtained if downstream of the microdispersion device the product undergoes a mixing treatment, in particular for obtaining a homogeneous product foam. It is then especially advantageous when the mixing treatment is performed by a static mixing device. The mixing device can be, for instance, a product processing device as mentioned, and has been found capable of applying a pressure decrease and shear to the product in a particularly simple manner.

According to another aspect of the invention, which can be combined with the above aspects, there is provided a portable apparatus for dispensing of a product:

a product container which contains a product that is to be foamed by and dispensed from the apparatus;

a gas container, at least containing a gas, for example a single gas or a gas mixture, wherein the gas substantially does not contain any greenhouse gases such as N2O;

a dispersion device, having a product entrance that is connectable to the product container for receiving product, the dispersion device further being connectable to the gas container for supplying the gas to the product during product discharge;

a processing device downstream of the dispersion device for performing a mixing treatment and/or pressure reduction on the product provided with the gas; and a product dispensing head, and being arranged downstream of the processing device, the dispensing head defining a product receiving space to receive the product from the processing device, a distal part of the dispensing head preferably having product shaping projections, wherein the product container is integrated in a housing, the housing having a top that includes a discharge valve for discharging the product, the top of the housing further including a gas inlet for feeding gas into the housing, wherein the apparatus also includes a top section that is fitted to the top of the housing, the top section including a pressurized gas supply means containing pressurized gas, for inducing gas flow and product flow during operation, wherein an outlet of the pressurized gas supply means is connectable to the gas inlet of the housing.

In this way, the above-mentioned advantages can be achieved. The pressurized gas supply means can e.g. be made relatively compact for their integration in the top section of the housing. Also, relatively high initial pressure can be used in these pressurized gas supply means.

For example, the product discharge valve of the housing can include a product discharge channel and a gas discharge channel, the gas discharge channel for example being concentrically arranged with respect to (e.g. around or inside) the product discharge channel, or the channels extending next to each other (e.g. in parallel).

According to yet another aspect of the invention, which can be combined with the above aspects, there is provided a portable apparatus for dispensing of a product, including:

a product container which contains a product that is to be foamed by and dispensed from the apparatus;

a gas container, at least containing a gas, for example a single gas or a gas mixture, wherein the gas substantially does not contain any greenhouse gases such as N2O;

at least two dispersion devices, each having a product entrance that is connectable to the product container for receiving product, the at least two dispersion devices further being connectable to the gas container for supplying the gas to the product during product discharge;

a processing device downstream of the dispersion devices for performing a mixing treatment and/or pressure reduction on the product provided with the gas; and a product dispensing head, and being arranged downstream of the processing device, the dispensing head defining a product receiving space to receive the product from the processing device, a distal part of the dispensing head preferably having product shaping projections, wherein the dispersion devices are arranged for operating at the same time.

In this way, the above-mentioned advantages can also be achieved. Also, in this way, relatively compact means can provide relatively foamed product flow/dispensing rates, for example such that good foodproduct shaping can be achieved by downstream foodproduct shaping projections (if any).

According to yet another aspect of the invention, which can be combined with the above aspects, there is provided a portable apparatus for dispensing of a product, the apparatus including:

a product container which contains a product that is to be foamed by and dispensed from the apparatus;

a gas container, at least containing a gas, for example a single gas or a gas mixture, wherein the gas substantially does not contain any greenhouse gases such as N2O;

a dispersion device, having a product entrance that is connectable to the product container for receiving product, the dispersion device further being connectable to the gas container for supplying the gas to the product during product discharge;

a processing device downstream of the dispersion device for performing a mixing treatment and/or pressure reduction on the product provided with the gas; and a product dispensing head, and being arranged downstream of the processing device, the dispensing head defining a product receiving space to receive the product from the processing device, a distal part of the dispensing head preferably having product shaping projections, the apparatus including a pressurized gas supply means containing pressurized gas, for inducing gas flow and/or product flow during operation, wherein an initial pressure in the pressurized gas supply means is higher than 15 bar, in particularly higher than 50 bar, for example higher than 100 bar.

In this way, also, the above-mentioned advantages can be achieved. The afore-mentioned pressure, higher than 15 bar, is in particular a pressure measured at a temperature of 20 0C.

For example, the pressurized gas supply means may include a gas cartridge, in particular having a rigid construction, and being configured to withstand an internal gas pressure of at least 50 bar, e.g. at least 100 bar, more particularly at least 200 bar (measured at 20 0C), and preferably made of steel and preferably having a maximum internal volume of 200 ml, for a maximum example internal volume of 20 ml, in particular 14 ml).

The invention also provides a method for foaming and dispensing a product, the method including using an apparatus according to the invention, According to an embodiment, the method includes: supplying product to a dispersion device and supplying a first gas to the dispersion device, wherein the first gas preferably does not contain any greenhouse gases such as N2O, wherein the product follows a first path through the dispersion device and receives the first gas via the dispersion device, wherein the product undergoes a controlled pressure reduction downstream of the dispersion device, wherein the product follows a second path during the controlled pressure reduction that substantially deviates from the first path.

Also, according to an aspect, there is provided a method for foaming and dispensing a product, for example an above-mentioned method, wherein the method includes:

supplying product to a dispersion device and supplying a first gas to the dispersion device, wherein the first gas preferably does not contain any greenhouse gases such as N2O, wherein the product receives the first gas via the dispersion device, wherein the product undergoes a controlled pressure reduction downstream of the dispersion device, wherein a second gas is used for inducing both the product flow and the flow of the first gas, the second gas being kept separate from the first gas.

BRIEF DESCRIPTION OF THE FIGURES

Further advantageous embodiments are described in the dependent claims. Examples of the invention will now be elucidated in more detail with reference to the drawings. Therein shows:

FIGS. 6A-6B a partly opened detail of the second embodiment of the invention is side view, in two operational states;

FIGS. 15A-15D a third embodiment of a dispensing and foaming apparatus, in four operational states;

FIG. 18 an opened side view of a top section of the third embodiment,

Similar or corresponding features are denoted by similar or corresponding reference signs in this application.

DETAILED DESCRIPTION

Figure 1:
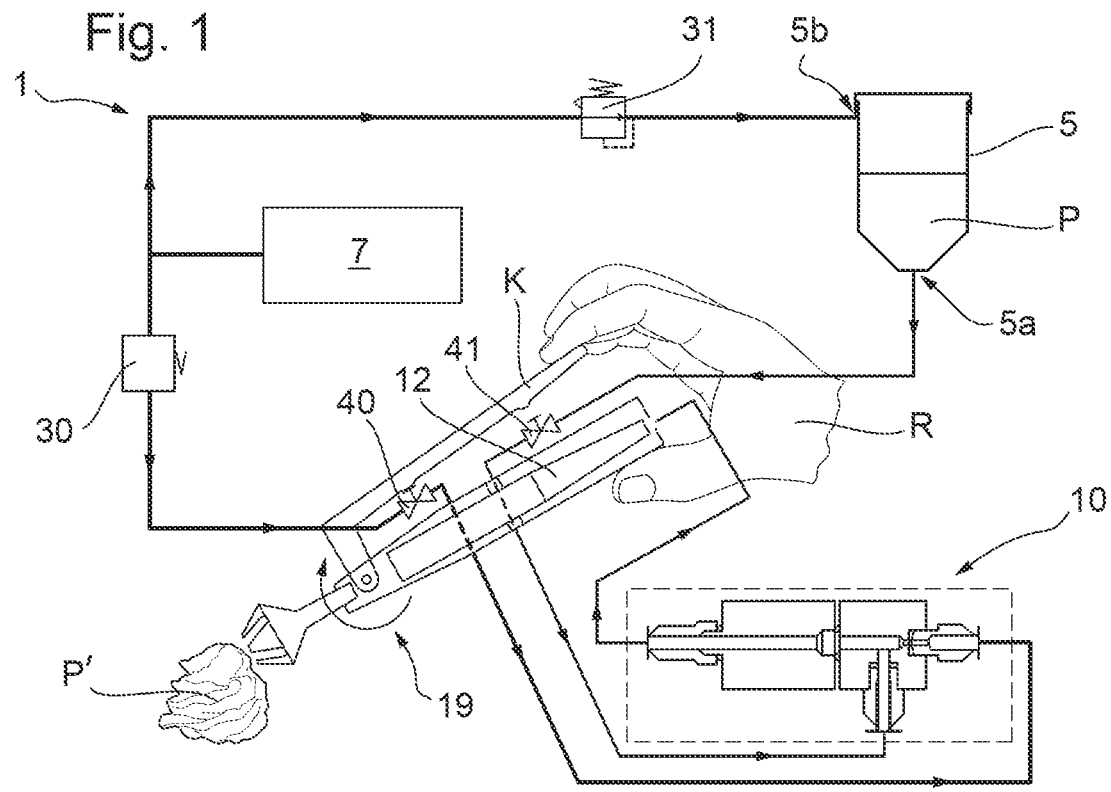
FIG. 1 schematically a first non-limiting embodiment of the invention.
Figure 4:
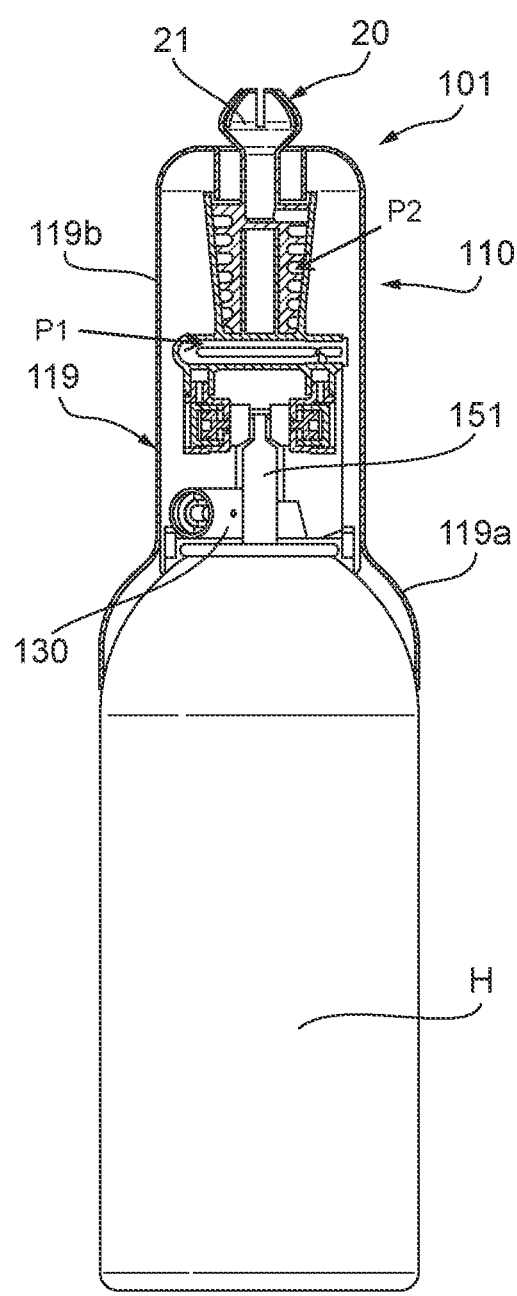
FIG. 4 a similar view as FIG. 3 from another viewing angle, of the second embodiment.
Figure 5:
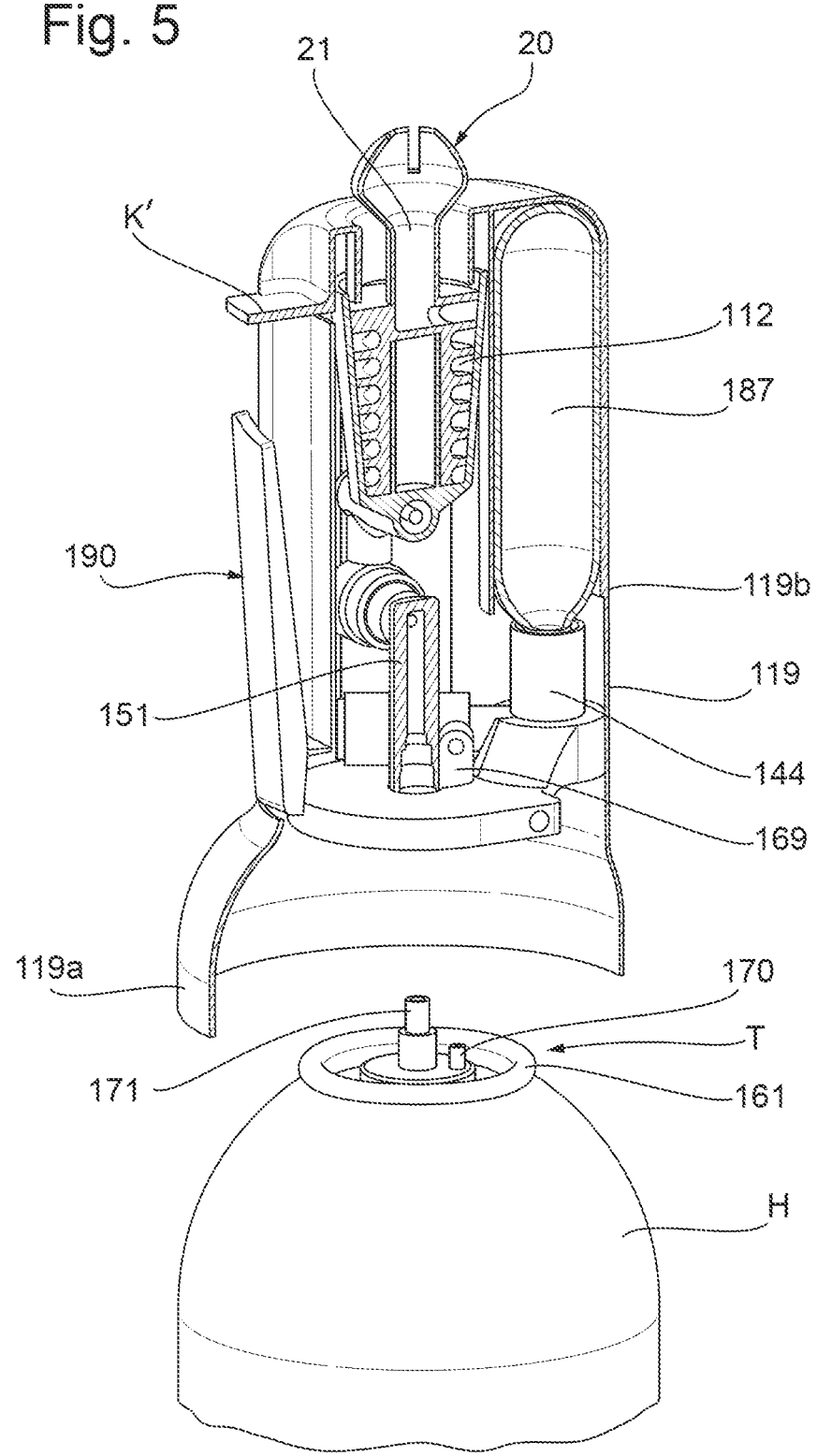
FIG. 5 a perspective view of the second embodiment, with a top section of the apparatus being separated.
Figure 14A:
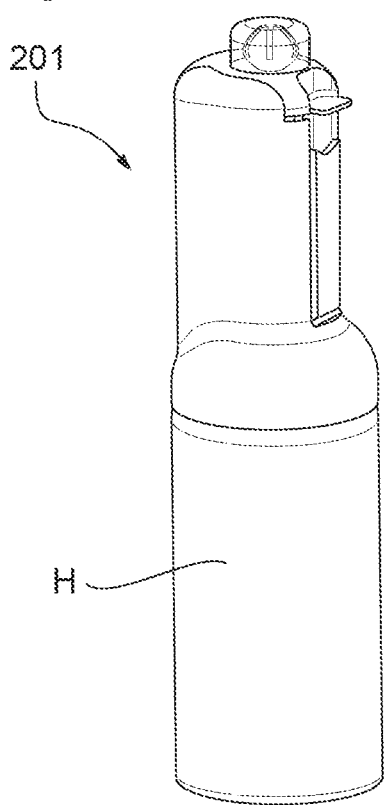
FIGS. 14A-14C the second embodiment, in three operational states.
Figure 14B:
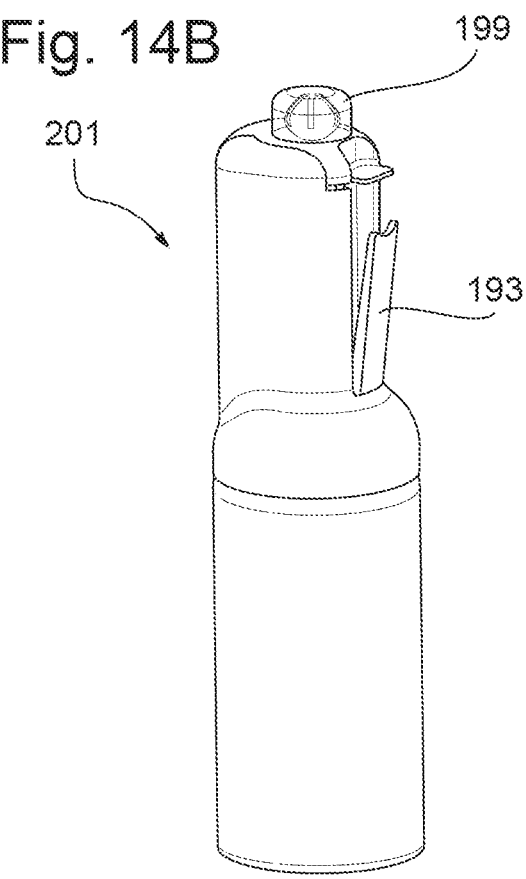
Figure 14C:
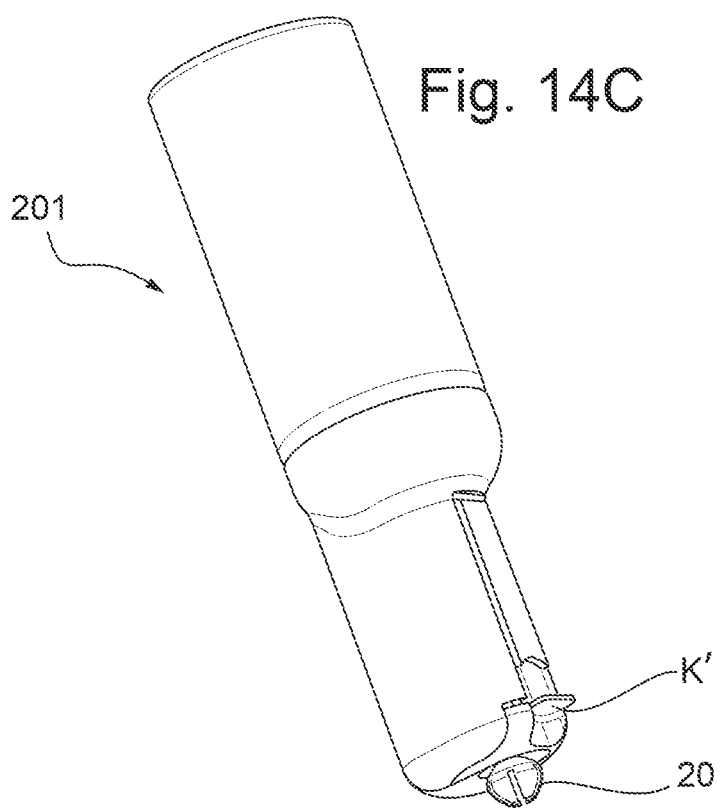
Figure 16A:
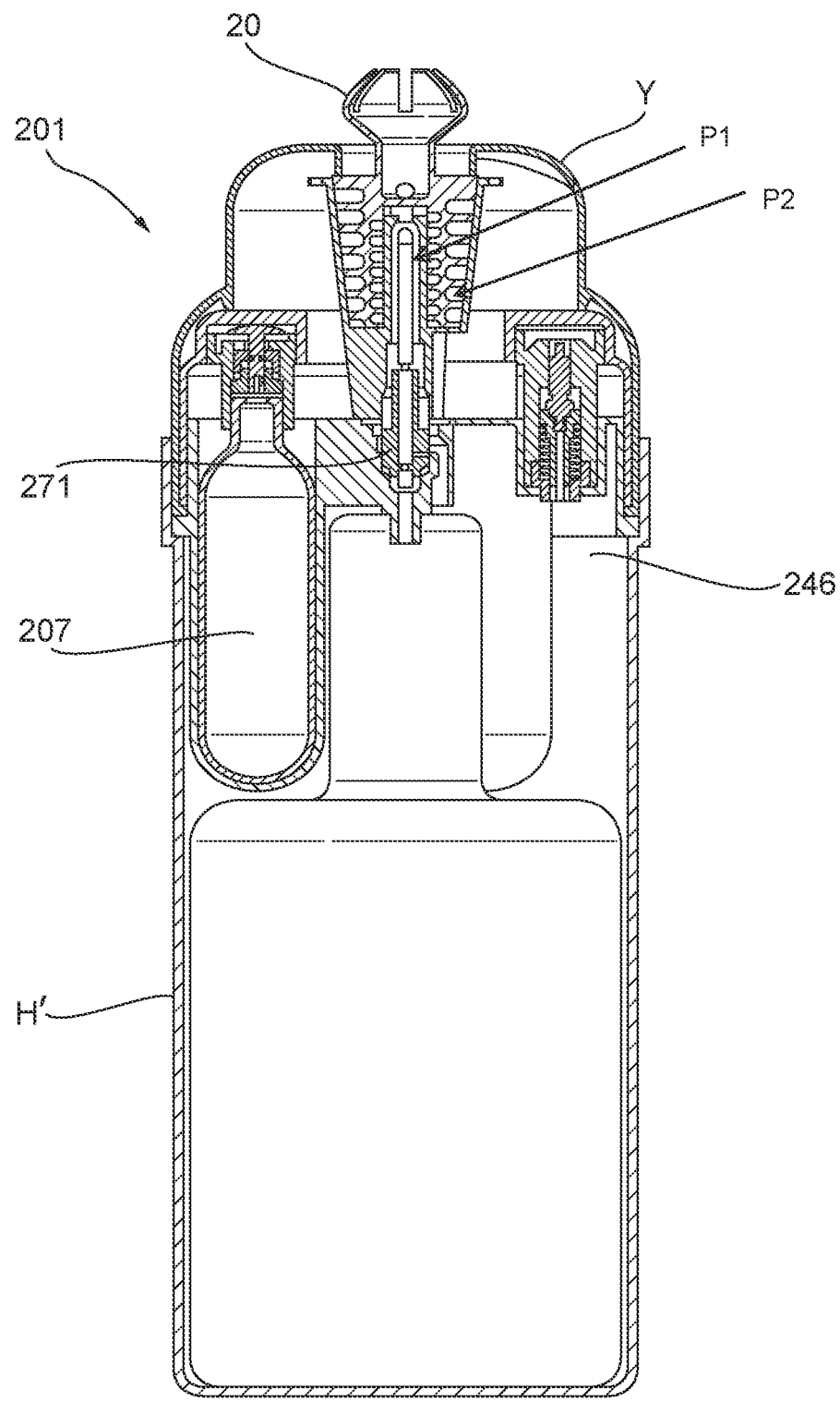
FIGS. 16A-16B opened side views of the third embodiment of FIG. 15, before and after separation of a top section, respectively.
Figure 16B:
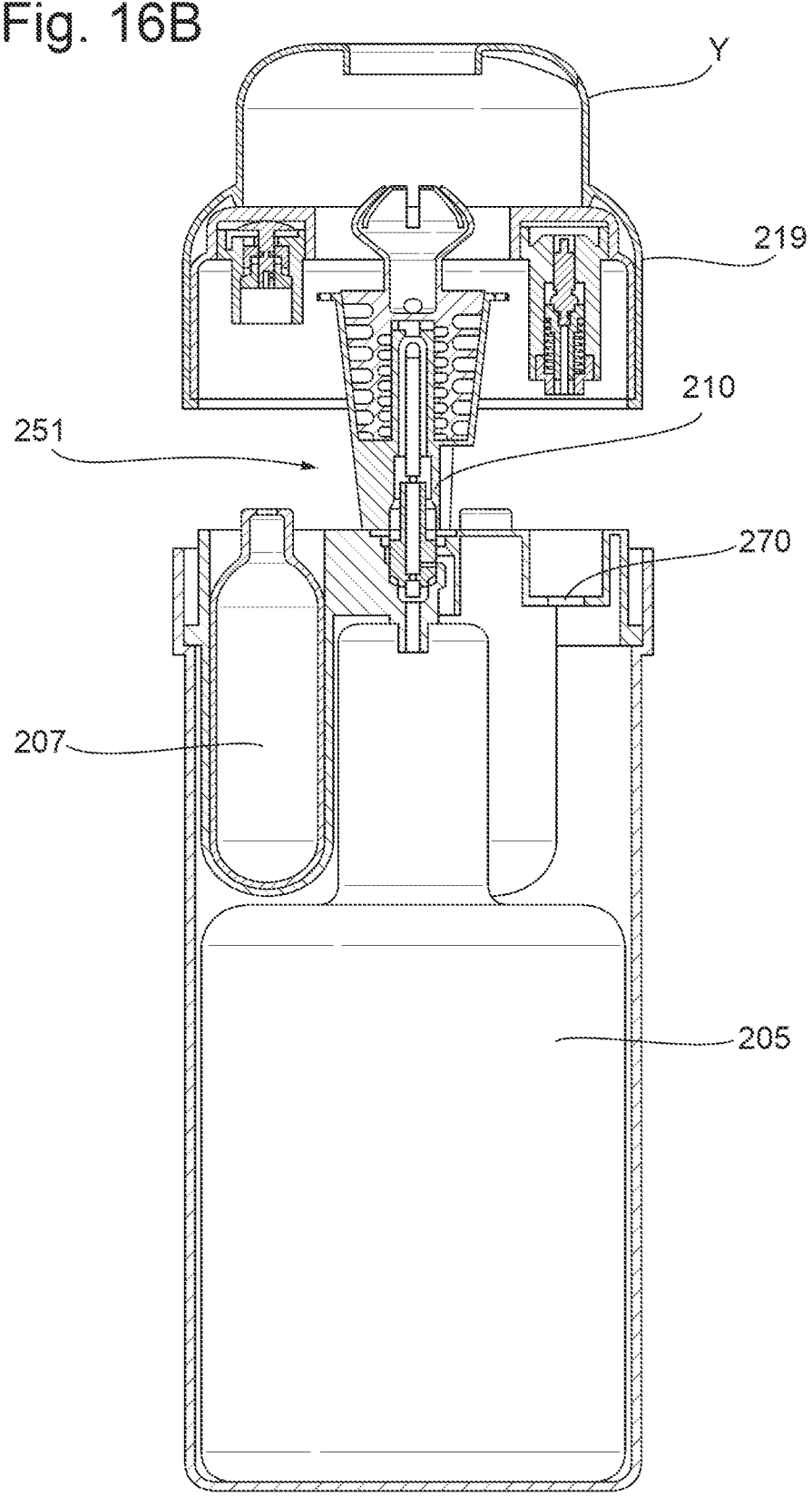
Figure 17A:
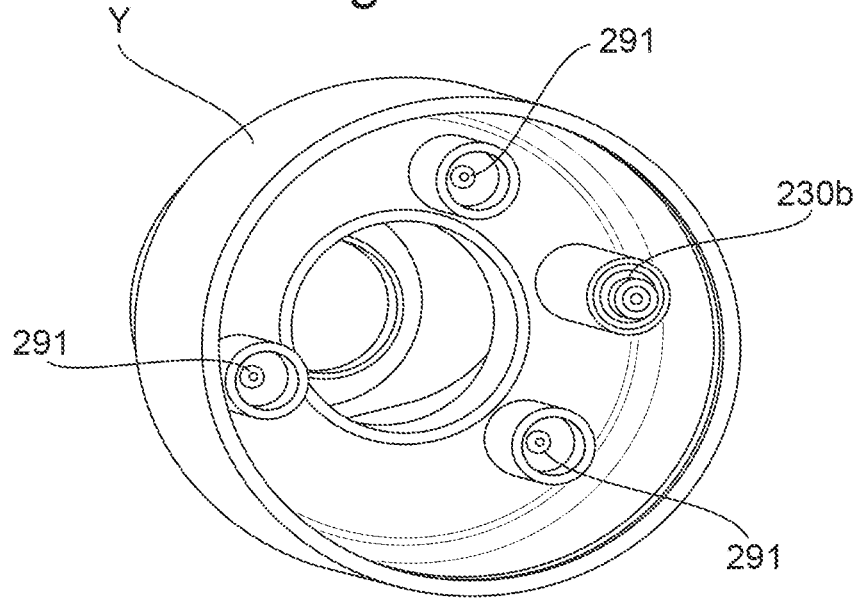
FIG. 17A, 17B a perspective bottom and top view, respectively of part of the third embodiment.
Figure 17B:
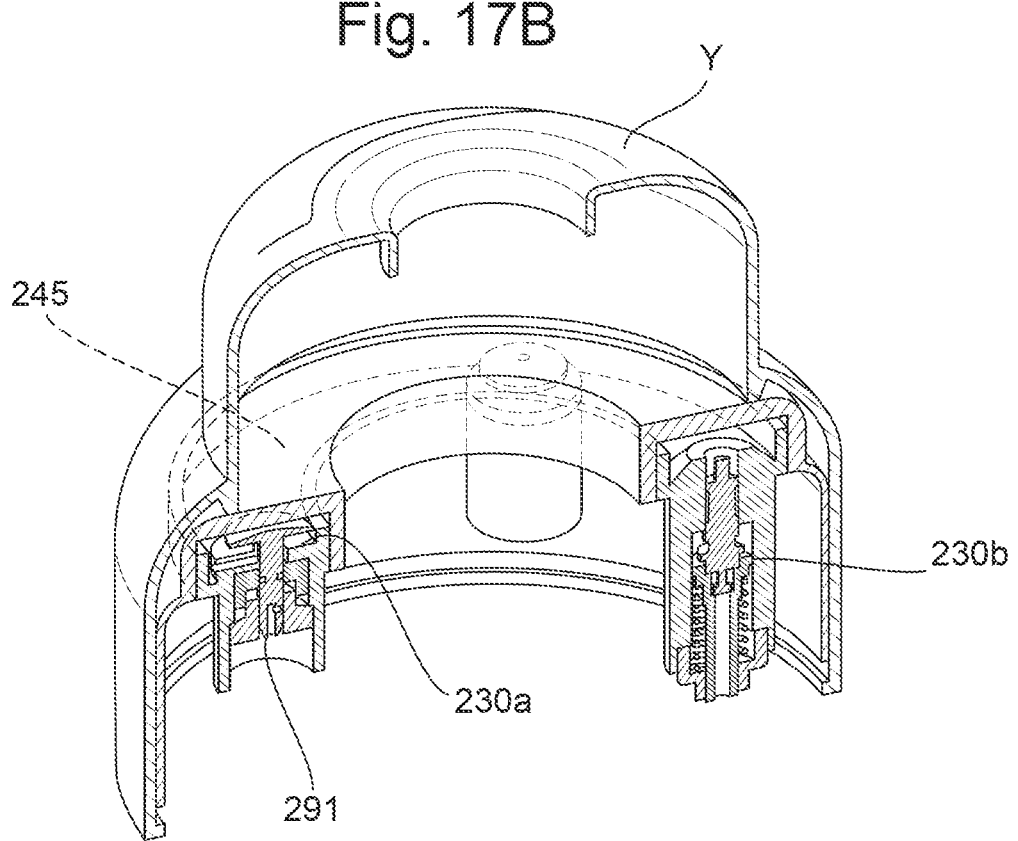

FIG. 1 schematically shows parts of a portable apparatus 1 for dispensing of a product P (and discharging a foamed product P'). The apparatus 1 includes:
- a product container 5 which contains a product P that is to be foamed by and dispensed from the apparatus;
- at least one gas container 7, at least containing a gas, for example a single gas or a gas mixture, wherein the gas substantially does not contain any greenhouse gases such as N2O;
- at least one gas dispersion device 10, having a product entrance that is connectable to the product container 5 for receiving product P, the dispersion device 10 further being connectable to the gas container 7 for supplying the gas to the product P during product discharge;
- a processing device 12 downstream of the dispersion device 10 for performing a mixing treatment and/or pressure reduction on the product provided with the gas; and
- a product dispensing head 20, being part of a top section 19 of the apparatus 1 and being arranged downstream of the processing device 12, the dispensing head 20 defining a product receiving space 21 (see FIG. 4, 5) to receive the foamed product P' from the processing device 12, a distal part of the dispensing head 20 preferably having product shaping projections 22, The apparatus 1 is configured to be used at least in a substantially upside-down orientation during product discharge, as is indicated in FIG. 1 (see also FIG. 14C and FIG. 15D regarding the further embodiments). It follows that the apparatus can be advantageously configured to be used by reorientation the apparatus 1 from an initial storage position, for example by rotating the apparatus over an angle of at least 90 degrees (with respect to a virtual horizontal rotation axis), for example to an up-side down orientation or similar downwards arrangement. Also, for example, according to a preferred embodiment, the apparatus does not include a dip-tube for receiving product P from the product container (i.e. no dip-tube has to be present in the product container), or it includes a flexible bag-on-valve type product holder that packs product without gas/air voids.

Figure 3:
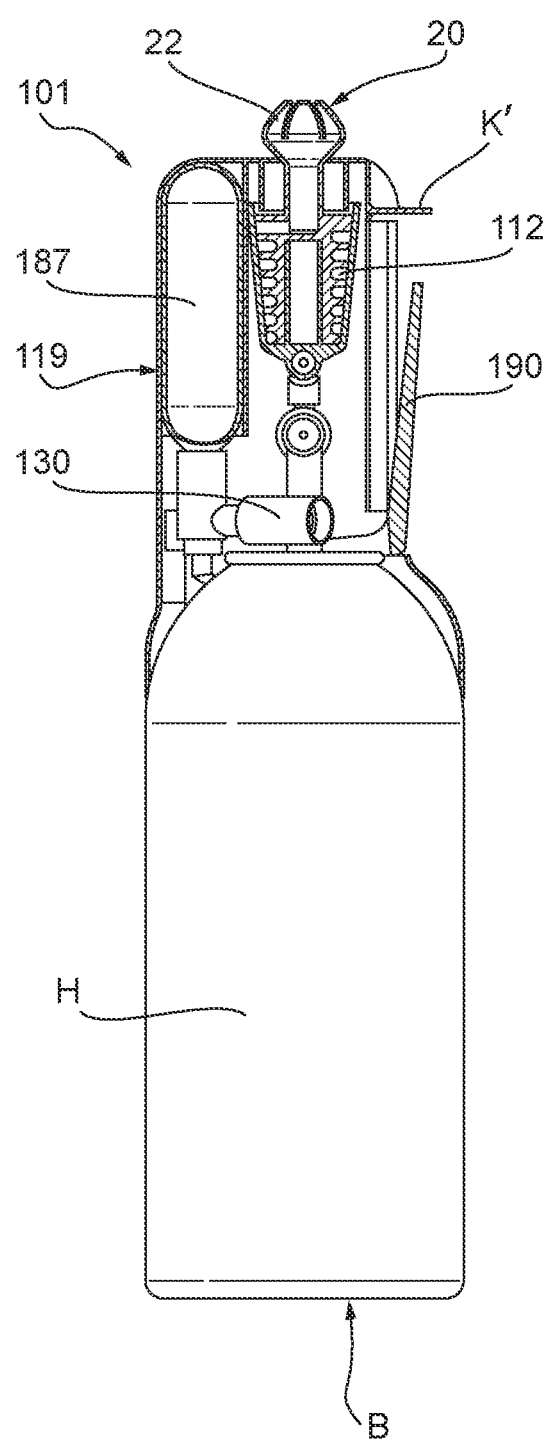
FIG. 3 a partly opened side view of a second embodiment of a product dispensing apparatus.

The apparatus has a portable housing H (not shown in FIG. 1, see also the housings H of the second and third embodiments 101, 201, in FIGS. 3 and 14), provided with a bottom B facing away from the product dispensing head 20, the product dispensing head 20 in particular being mounted or mountable to a top section of the apparatus. It is preferred, (as in the examples shown in FIGS. 3-23), that the product container is integrated in the housing H.

The housing H of the apparatus is shaped to be lifted single-handed by a user (a user's hand R operating the apparatus is shown in FIG. 1), for example a housing H having an elongated shape and/or having a maximum width of 10 cm at a gripping position. For example, the housing H as such can be configured or shaped to provide ease of lifting and manual reorientation by the user. In the present examples, the housing H has a substantially cylindrical external side for that aim, but the external shape of the housing is not limited there-to.

Further, the apparatus 1 includes an operating means K, for example a handle or knob, that can be manually controlled for starting and subsequently halting product foaming and dispensing. The operating means K can be configured to cooperate with e.g. flow control means 40, 41 (e.g. respective flow valves) for controlling gas flow and product flow.

The apparatus 1 particularly includes a pressurized gas supply container 7 containing pressurized gas, for inducing gas flow and product flow during operation. In one embodiment, an initial pressure in the pressurized gas supply means can be relatively high, namely higher than 15 bar, in particularly higher than 50 bar, for example higher than 100 bar (pressures being measured at 20 0C). By using a pressurized gas container 7 having such a high (initial) pressure, relatively long operational discharge period can be achieved using relatively compact means. In an alternative embodiment, the initial pressure in the pressurized gas supply means can be at most 15 bar, for example a pressure in the range of 10-15 bar (e.g. about 12 or 13 bar).

In a preferred embodiment, for example, the pressurized gas supply means 7 is a disposable gas cartridge, preferably being configured to withstand an internal gas pressure of at least 50 bar, e.g. at least 100 bar or even at least 200 bar, and preferably made of steel and preferably having a maximum internal volume of 200 ml, for a maximum example internal volume of 20 ml (e.g. 14 ml). Such gas cartridges are known as such, and can provide a relatively compact, cost-efficient, economical means for providing the apparatus 1 with the gas required for operation.

The dispersion device 10 as such can be configured in various ways. It can be provided e.g. by a porous mass, a sheet or membrane, a filtration tube (or tubular membrane), or differently.

Figure 2A:
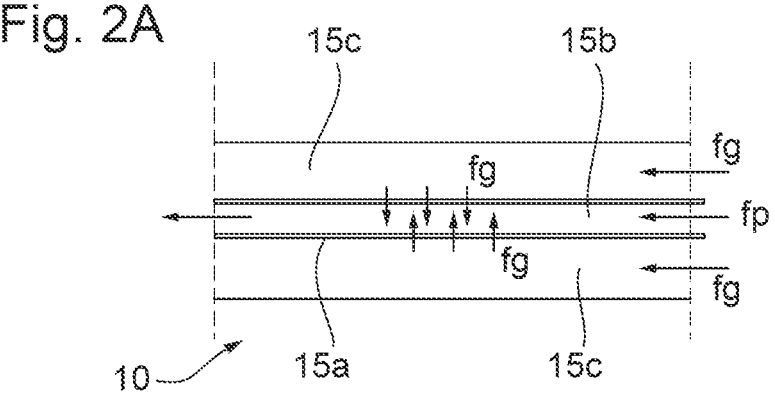
FIGS. 2A, 2B schematically a detail of the first embodiment of FIG. 1, according to two alternatives.
Figure 2B:
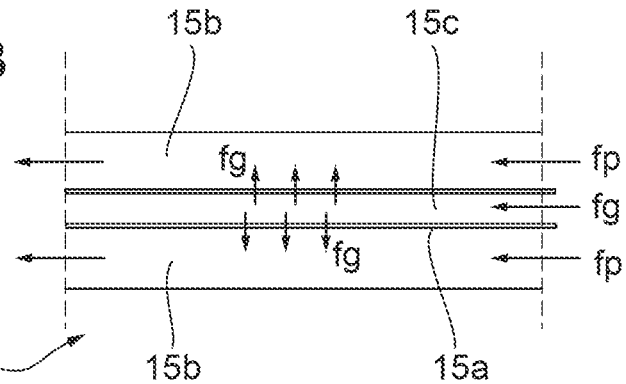

In the present example (see FIG. 1), the dispersion device 10 comprises a chamber and a gas dispersion tube, wherein the tube is preferably placed substantially spaced-apart, e.g.

centrally, from an inner side of the chamber. The tube can act as a wall (or 'dispersion element') 15a, separating the chamber into a product feed-through space 15b and a gas supply space 15c (see FIG. 2A, 2B). In FIG. 2A, the tube wall 15a encloses the product feed-through space 15b, wherein the gas is fed via the externally arranged gas supply space 15c, for dispersion into the product via the wall 15a. FIG. 2B shows an alternative arrangement, wherein the tube wall 15a encloses the gas supply space 15c, wherein the product is fed via an externally arranged product feed-through space 15b (to receive the gas). The latter arrangement can provide improved gas pressure control and respective dispersion during operation.

Good results can be achieved in case the dispersion device 10 is a microfiltration—or an ultrafiltration-type dispersion device, for example a dispersion device (e.g. tubular dispersion device) that is provided with a wall 15a (see FIG. 2) with gas transmissive pores having a pore size in the range of 0.1-200 microns, for example a range of 0.1-100 microns, in particular a pore size of at least 0.1 micron and less than 5 microns. In case of a dispersion device having a tubular wall 15a (see FIGS. 2A, 3, 4) relatively good results can be achieved utilizing a compact filter (membrane) tube.

For example, a respective (e.g. tubular) wall 15a of the dispersion device 10 can be of relatively small length (measured in longitudinal direction, i.e. in parallel with a general product flow direction through a respective product The processing device 12 can be configured in various ways. For example, the processing device 12 can be a static mixer. In a preferred embodiment, the processing device 12 can comprise at least one elongated channel (path), for example extending along a spiral and/or helix trajectory. For example, the expansion path or tube can be longer than 1 cm, for example longer than 10 cm, in particular at least being 15 cm in length, for providing a good controlled pressure reduction downstream of the dispersion device 10. An example of a relatively compact processing device 12, providing a relatively long helical product processing path, is also shown in the embodiments of FIGS. 3-18 (see below); the helical and/or spiral path can include e.g. numerous subsequent loops (e.g. at least 2 loops) providing a desired long processing path length.

The apparatus can further comprise a pressure regulation means 30, 31, configured to regulate the pressure and/or ratio of product and/or gas fed to the dispersion device 10. In the example of FIG. 1, the pressure regulation means include a first pressure reducer 30, arranged in a gas flow path between the gas container 7 and the dispersion device 10. The first pressure reducer 30 is configured to reduce an afore-mentioned relatively high pressure of gas, received from the gas container 7, to a first predetermined lower pressure (i.e. lower than said relatively high pressure) for injection of the gas into the product via the dispersion device 10.

Also, in the example of FIG. 1, the pressure regulation means include a second pressure reducer 31, arranged in a gas flow path between the gas container 7 and the product container. The second pressure reducer 31 is configured to reduce the relatively high pressure of gas, received from the gas container 7, to a second predetermined lower pressure (i.e. lower than said relatively high pressure) for propelling product P out of the product container to the dispersion device 10, and such that the product can pass the dispersion device 10, receiving gas from the dispersion device, to be discharged via the discharge nozzle 20 as a foamed product P'.

In a further, preferred, embodiment, the apparatus includes control means 40, 41 for controlling gas flow and product flow, preferably such that a supply of gas from the gas container 7 to the dispersion device 10 is started before supply of product thereto, in particular upon actuation of an operation means K of the apparatus. For example, a said operating means K can be arranged to actuate a gas flow control means 40 before actuating a product flow control means 41 during manual discharge activation of the apparatus via the operating means K. Also, or in addition, it is preferred that the control means 40, 41 can be configured such that product enters the dispersion device 10 just after the gas enters that device, e.g. to prevent that product is forced into the dispersion wall 15*a* (towards the gas supply space 15*c*) before that wall receives the gas from the gas supply space 15*c*.

In the embodiment of FIG. 1, the gas container provides the pressurized gas supply means 7. Alternatively, see e.g. FIGS. 3-11, the pressurized gas supply means 187 can be separate from the gas container.

Referring to FIG. 1, the apparatus can contains a single gas container 7, containing the gas, for example a single gas or a gas mixture, that substantially does not contain any greenhouse gases such as N2O. For example, the respective gas can be nitrogen, argon, or air, or a mixture thereof. In a preferred embodiment, the apparatus can contain a plurality of such gas containers 7, for example a plurality of relatively compact gas containers, mutually providing relatively long operating periods.

As will be explained in further detail below, an outlet of the pressurized gas supply means 7 may be initially is sealed by a closed sealing structure. Then, preferably, the apparatus 1 may include a mechanism (e.g. a seal piercing structure) for opening the sealing structure prior to an initial use of the gas supply means 7. Thus, the apparatus 1 can be stored and transported safely before initial use, without downward sections of the integrated gas supply system being pressurized yet The product P can be a foodproduct, for example containing milk or dairy cream, or a different type of product that is to be foamed. In particular, the product P is a foamable liquid or liquid-like substance (in particular at operating temperature, i.e. during normal use). As is indicated in FIG. 1, such a product P will be located at least at a vertically lower level within the respective container 5, under the force of gravity. In this example, the arrangement of the product container 5 is such that a respective product exit 5*a* is located at a substantially lower level of the product container 5 when the apparatus 1 (including that container 5) 1 held in the substantially upside-down discharge position. This can ensure that product P is at least present at the product exit 5*a* when the apparatus 1 is being operated (via a respective operating means K) to discharge the product P. In another embodiment, the product can be held within a flexible Bag-on-Valve (BOV) type container, wherein the product can be forced towards the outlet ('valve') of the container irrespective of the orientation of the container.

In the example of FIG. 1, the content of the product container 5 is configured to be directly pressurized by the gas (from the gas container 7). To that aim, the product container 5 can include a gas inlet 5*b* for receiving the gas during operation. In a further, preferred embodiment, the product container is a flexible bag, for example a bag to be compressed by external gas pressure during operation. An example of such a configuration is shown in FIGS. 3-11 (see below).

Alternatively, see FIG. 22, the apparatus 1 can be configured to cooperate with an external compressor and/or high pressure external gas reservoir, for charging or recharging the gas container. Moreover, in yet another embodiment, see FIG. 23, the apparatus 1 can includes an internal compressor, for charging or recharging the gas container.

Operation of the apparatus 1 can include a method for foaming and dispensing the product P. Before an initial use, an optional seal of the gas container 7 may be removed or broken by the user. Next, the user can reposition the apparatus 1 (e.g. from an initial idle or storage position) to a substantially downwards (upside-down) orientation and e.g. aim the apparatus discharge nozzle 20 to a product receiving area. Next, the user can initiate product foaming and discharge by actuation of the operating means K, e.g. by pressing or moving a respective actuator element, handle or knob (if any) from a idle position to an active position. As a result of the actuation of the operating means K, the gas flow control means 30, 31 open respective flow paths. Consequently, gas is released from the gas container 7 into the product container 5, and propels product P via the container exit 5*a* and a respective product supply path towards and through the dispersion device 10. Gas is also released from the gas container 7 directly towards the dispersion device 10 (via a respective gas supply path), to be injected via that device 10 to foam the product. As is mentioned before, preferably, a gas flow into the dispersion device 10 is started just before the product flow into the dispersion device starts (e.g. as provided by the flow control means 30, 41). In this way, e.g., clogging of the dispersion device and/or discharge can be prevented and a regular product discharge can be achieved. Preferably, the resulting product is processed in/by the downstream processing device 12, performing a mixing treatment and/or pressure reduction on the product. The processed foamed product P' is then discharged via the nozzle 20, and can e.g. be shaped by respective nozzle projections (e.g. teeth) 22 if present.

After a desired amount of foamed product P' has been discharged, the user can release the operating means K, which can then return to an initial idle state, so that the gas flow control means 30, 31 close respective flow paths.

In this example, the foamed product P' is discharged vertically downwards or in a direction that includes a certain angle with a vertical plane (e.g. an angle in the range of 0-90 degrees, more particular an angle in the range of about 0-45 degrees with a vertical plane). Thus, operation of the apparatus is extra user friendly.

In this case, the same gas is used for inducing the product flow and for foaming of the product, by injecting that gas into the product.

Alternatively, as in the second embodiment, a second gas can be used for inducing both the product flow and the flow of the first gas, the second gas being kept separate from the first gas. For example, the second gas can remain in the apparatus during and after use of the apparatus.

A major advantage of the present invention over such prior art aerosol containers is that the present apparatus 1 substantially does not discharge greenhouse gases during operation and can still provide good foaming results, product shaping results (if desired) at a relatively high level of hygiene.

FIGS. 3-14 show a second non-limiting embodiment of the invention. The second embodiment differs from the first embodiment in that the apparatus 101 includes two different gas containers 107, 187. One of the gas containers 107 contains the gas that is to be injected into the product P. The other gas container 187 includes a pressurized gas, for inducing the foaming process.

Figure 8:
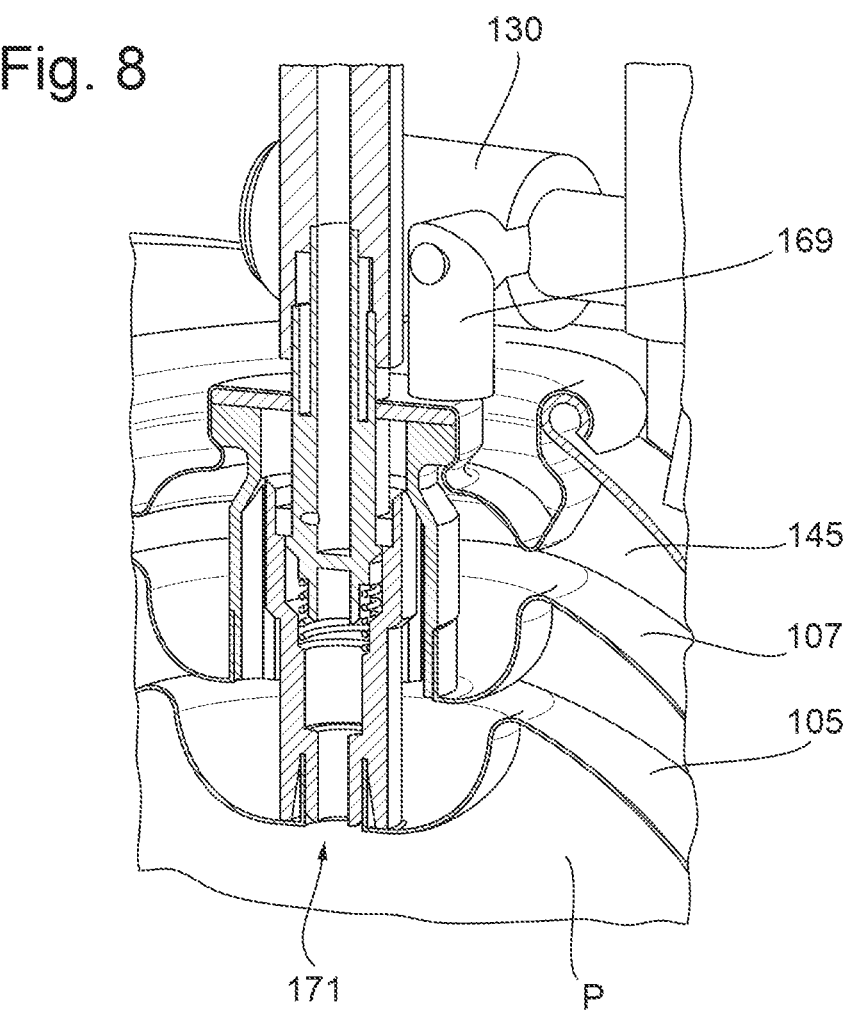
FIG. 8 a partly opened detail at the valve section of the second embodiment.
Figure 9:
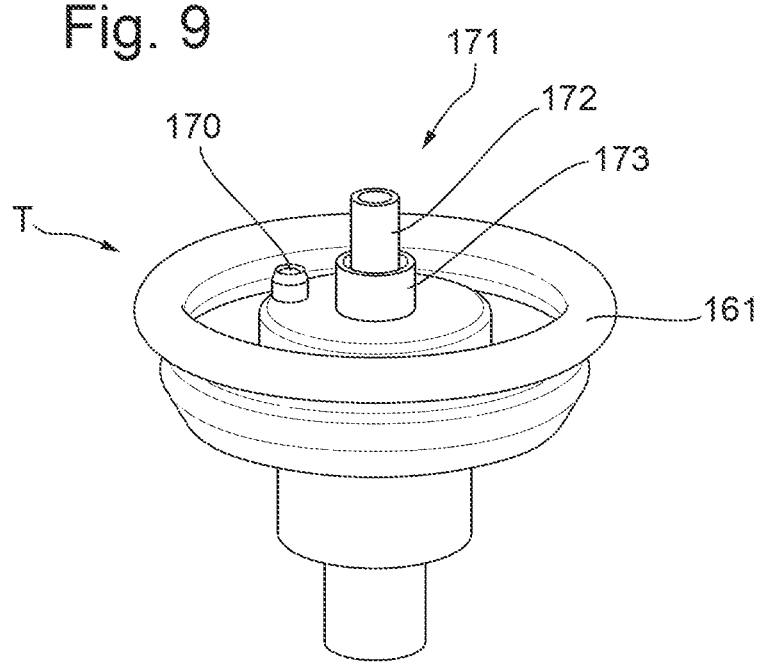
FIG. 9 a perspective view of the valve section of the second embodiment.
Figure 10:
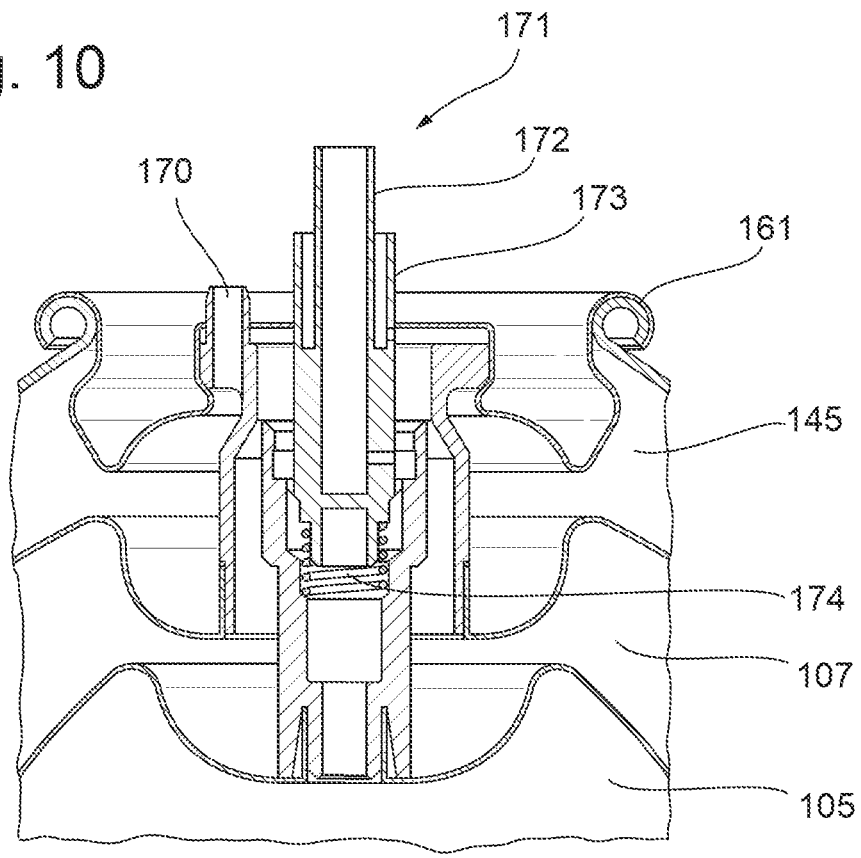
FIG. 10 an opened side view of the valve section of the second embodiment, when the discharge valve is in an initially closed state.
Figure 11:
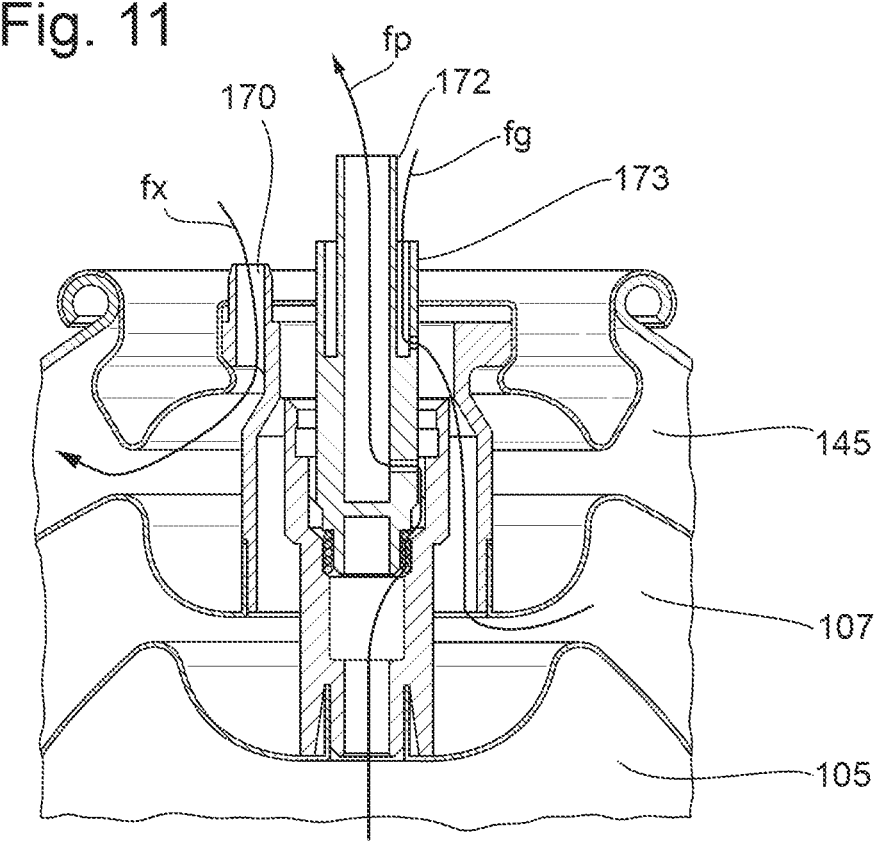
FIG. 11 a view similar to FIG. 10, indicating gas and product flows, when the valve has been moved to an open valve state.
Figure 12:
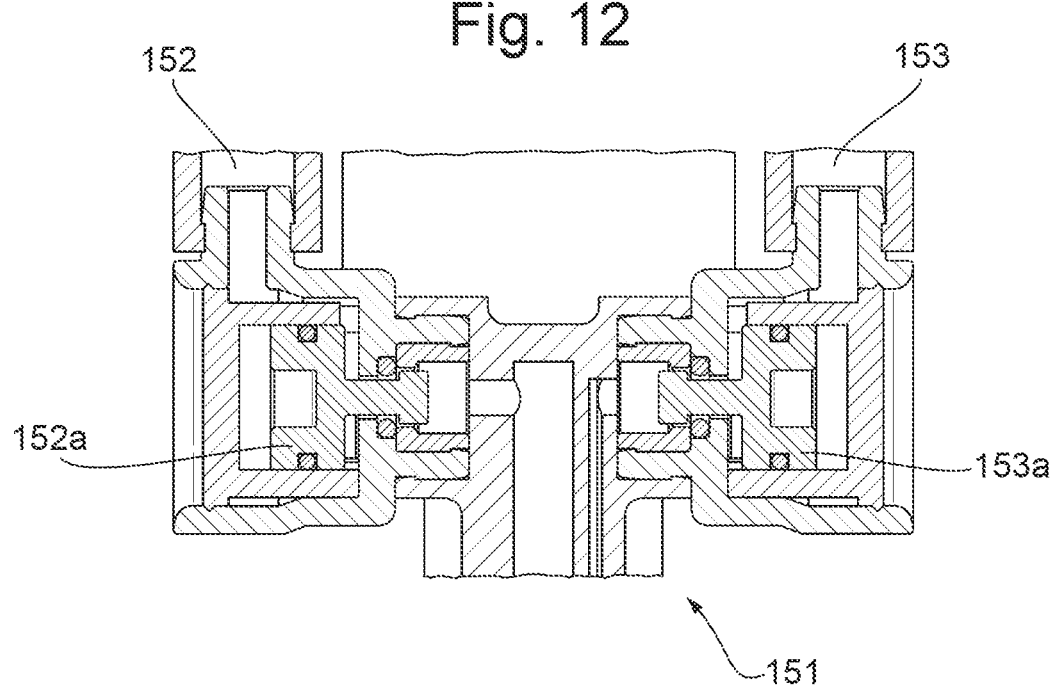
FIG. 12 a detail, in opened side view, of a pressure reducing section of the second embodiment.

In particular, in the second embodiment, the product container 105 integrated in the housing H. Part of the product container 105 is shown in FIGS. 8, 10, 11.

In particular, the product container 105 is a flexible bag, configured to be compressed by external gas pressure during operation for product discharge.

Also, in the second embodiment, the first gas container 107 that contains non-greenhouse gas, is integrated in the housing H. Part of the respective gas container 107 is also shown in FIGS. 8, 10, 11. This gas container 107 can for example be a flexible bag as well, configured to be compressed by external gas pressure during operation for gas ejection.

It should be observed that a flexible product container 105 may be entirely or partly flexible. For example, such a product container may include at least a flexible wall section that can be moved inwardly under external pressurization, allowing discharge of the content of the container.

Similarly, it should be observed that a flexible gas container 107 may be entirely or partly flexible. For example, such a gas container may include at least a flexible wall section that can be moved inwardly under external pressurization, allowing discharge of the gaseous content of that container.

Moreover, in the present example, the flexible product container 105 extends within the flexible gas container 107. Thus, the embodiment can be called a 'bag-in-bag' type apparatus. Alternatively, two bag-type containers (one for product and one for gas) can be located next to each other within the housing H of the apparatus.

The housing H further includes a pressurization (i.e. compression) chamber 145 that encloses (surrounds) both the product container 105 and the gas container 107. By pressurizing the pressurization chamber 145, in particular, by feeding a pressurized second gas (emanating from the second, pressurized, gas container 187) into that chamber, both the product container 105 and the gas container 107 can be pressed inwardly for product and gas discharge. A gas that is fed into the pressurization chamber can remain in that chamber, i.e., it does not mix with the product and with the content of the flexible gas container 107. Thus, the pressurizing gas may substantially be e.g. a greenhouse gas (for example N2O), wherein the apparatus can ensure that that gas does enter an environment during product discharge.

Besides, in this example, the flexible product container 105 extends substantially within the flexible gas container 107, wherein gas (to be ejected) can be held in a space between the walls of the two containers 105, 107. Alternatively, for example, a flexible gas container may extend substantially within a flexible gas container, wherein product to be expelled is located between the two containers. Also, in another embodiment, the flexible product container 105 and flexible gas container 107 may both be located next to each other, separately, within the pressurization chamber 145 of the housing H Further, the housing H (and e.g. respective product container and other parts of the apparatus) may have a disposable construction.

In this example, the housing H has a construction similar to a common aerosol container, having a substantially cylinder shaped wall with a top section T having a central top rim 161, centrally of which there is a product discharge valve 171. The discharge valve is movable inwardly (slightly into the housing H) against spring force (of a spring 174, see FIG. 10), from a closed valve state to an open valve state, allowing discharge of product from the valve. An upstream section of the discharge valve 171 is in fluid communication with the integrated product container 105, when the valve has been moved to its open valve state (as in FIG. 11).

Further, the present apparatus according to the second example has a top section 119 that has been connected to the rim 161 of the top of the housing H, for example via a clamping or clicking connection. In a further embodiment, the top section 19 of the apparatus may be removably connected to the housing H, for example allowing separate disposal after use.

In this embodiment, the top section 119 of the apparatus includes a downwardly expending skirt part 119a, configured to cover and smoothly join up with an external side of the housing.

In this case, the top section 119 (also) includes a substantially cylindrical cap section that includes various product discharge operating elements, as will be explained in the following.

In the second (and third) embodiment, in particular, the top section 119 of the apparatus includes the dispersion device 110 and a respective downstream processing device 112, as well as the dispensing head 20. Also, the top section 119 may include a pressurized gas supply means 187, i.e. the afore-mentioned second gas container 119 (see e.g. FIG. 5). Moreover, gas pressure control means can be located within that top section 119, whereas the top section 119 can further be provided with gas flow control means 130, a seal opening mechanism 190, and a manual operating means K.'

In this way, a relatively large volume can be provided within the housing for containing product. Also, this embodiment provides ease of use, good disposal properties (potentially even providing an option of reuse of one or more components after disassembly). Also, in this way, relatively small product flow paths can be achieved, thereby providing proper functioning low chances of contamination.

In particular, as follows from the drawings (FIG. 3-5), the top section 119 includes a second gas container 187, in the form of a pressurized gas cylinder. This pressurized gas container can be a rigid (e.g. disposable) gas cartridge, being configured to withstand an internal gas pressure of at least 50 bar, e.g. at least 100 bar or even at least 200 bar, and preferably made of steel and preferably having a maximum internal volume of 200 ml, for a maximum example internal volume of 20 ml (e.g. 14 ml).

Figure 7:
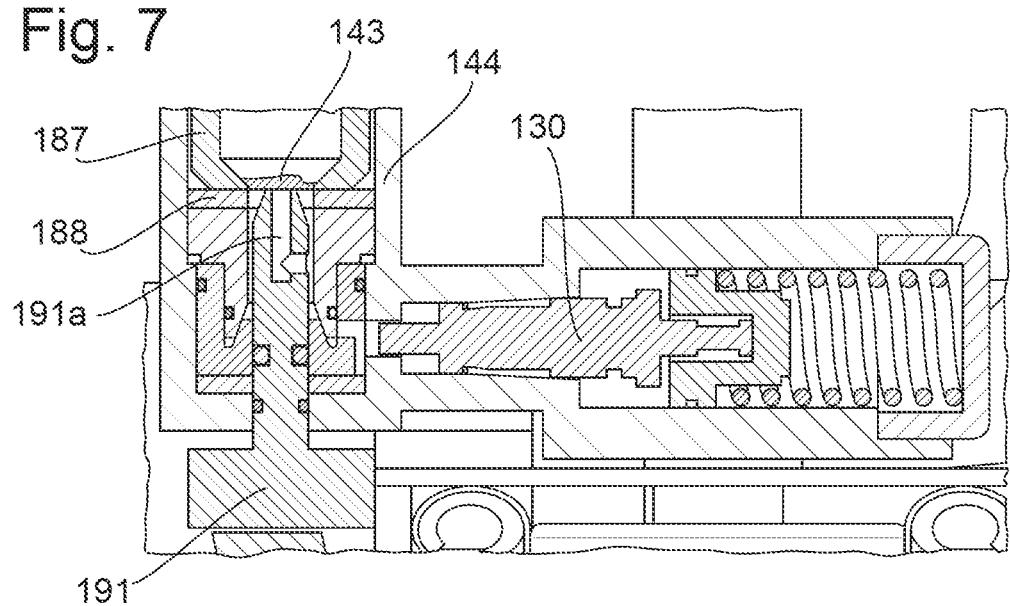
FIG. 7 a partly opened detail of the second embodiment, in another side view.

The present gas cylinder 187 extends substantially in parallel with a central axis of the housing, allowing a compact integration thereof. Referring to FIGS. 6A, 6B, 7, an outlet of the pressurized gas supply means 187 is preferably sealed by a closed sealing structure 143 before initial use. The sealing structure 143 can be configured in various ways, and can be e.g. a piercable element or seal. The apparatus (in particular its top section 119) also includes a manually controllable opening mechanism 190 for opening the sealing structure 143 prior to an initial use of the gas supply means 187. The present opening mechanism includes a piercing element 191, movable from an idle state (shown in FIG. 6A) wherein it does not penetrate the seal 143 to a piercing state (shown in FIG. 6B) wherein it has opened the seal 143 and receives gas from the content of the second gas container 187. The piercing element 191 may e.g. include an integrated gas feed channel 191a (see FIG. 7) for passing the gas to downstream gas channel of the apparatus.

Figure 21A:
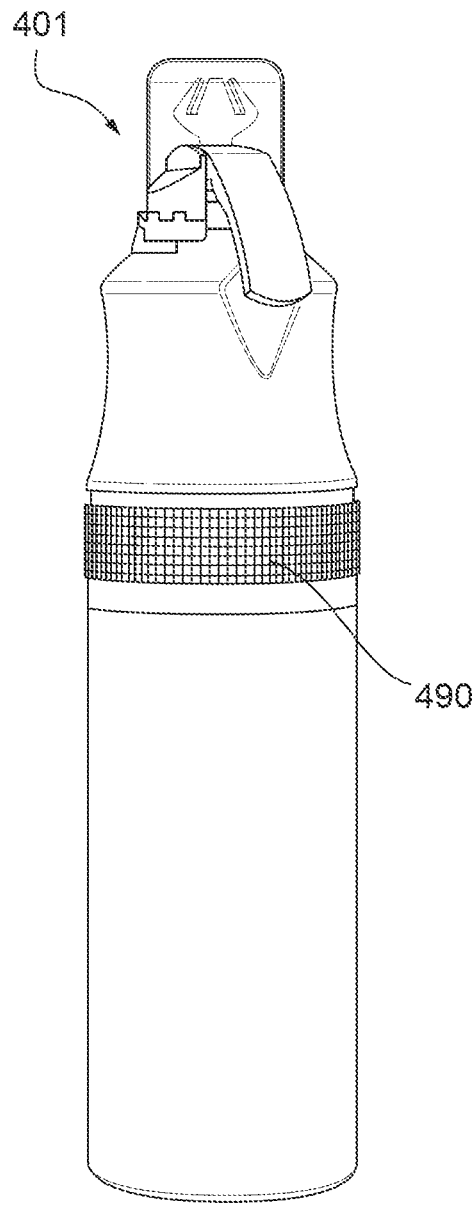
FIGS. 21A, 21B a perspective side view of a fifth embodiment, at FIG. 21B in partly opened view.
Figure 21B:
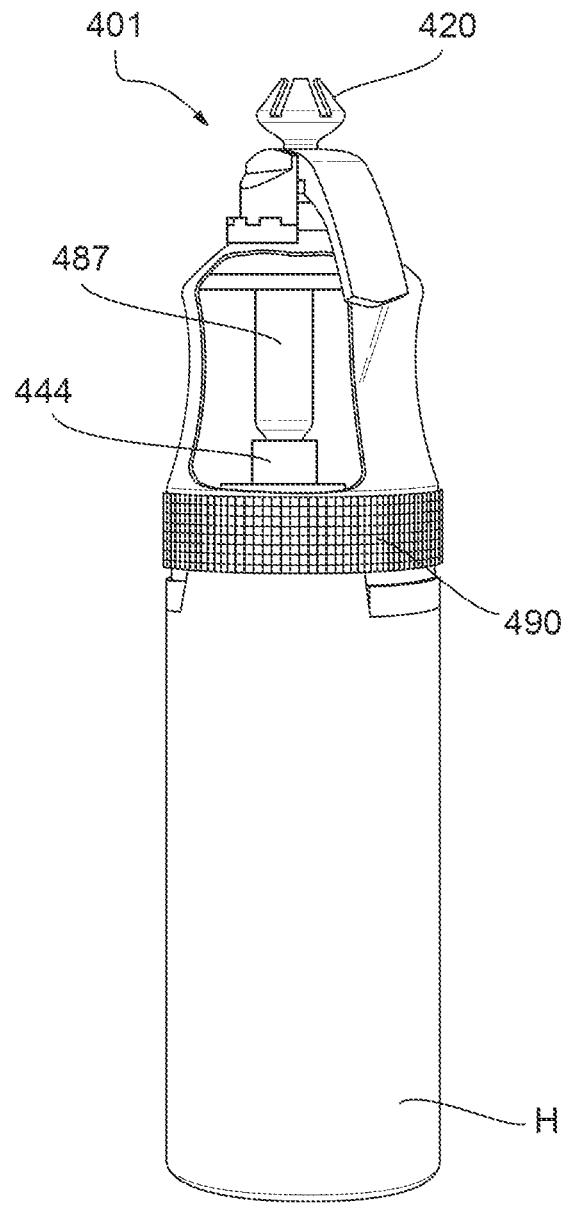

Furthermore, the manually controllable opening mechanism 190 may include e.g. a pivotable lever 193 that can mechanically cooperate with the piercing element 191 to push the element 191 towards the gas container 187 (for piercing the seal). FIGS. 21A, 21B show an alternative embodiment, wherein the manually controllable opening mechanism 490 includes a ring that is mounted at an external side of the housing H (concentric there-with).

In this example, the apparatus is configured to hold the second gas container gas container 187 firmly in place, in particular with its gas outlet rim onto a gas seal (e.g. a resilient sealing member) 188 to prevent unwanted escape of gas into the interior of the apparatus top section 119 after the seal 188 has been pierced. For locking the pressurized gas cylinder in place, e.g. a top of the cylinder (that includes the gas outlet) may e.g. be provided with screw thread, for turning and locking the cylinder in receiving screw-thread of a locking member 144 of the apparatus. The respective screw threads are not shown in the present drawings. In the present example, the locking member 144 is a locking sleeve that is arranged for receiving a neck portion of the gas cylinder 187.

Alternatively, a bayonet-coupling between the pressurized gas cylinder 187 and the locking member 144 may be applied, or a different type of fixation (e.g. via a glued connection). For recycling it is preferred that the second container 187 can be releasibly locked into its operation position, allowing removal of the container 187 (e.g. for reuse) at a recycling center after disposal of the apparatus.

Downstream of the second gas container 187, the top section of the apparatus includes one or more gas pressure regulators 130 for regulating pressure of gas, received from that container 187, to a certain (predetermined) operating pressure. For example, an initial gas pressure in the second gas container can be significantly higher than 15 bar (as mentioned before), whereas a predetermined operating pressure can be at most 15 bar (at 20 0C). The gas pressure regulator, or 'pressure reducer', can be configured in several means, including a suitable valve means (as in the drawings), as will be clear to the skilled person.

Downstream of the gas pressure regulator(s) 130, the top section 119 of the apparatus includes a gas feed channel 169 that is connected to a gas inlet 170 of the housing top T after assembly, for feeding pressure controlled gas into the housing H, i.e. into the pressurization chamber 145. In particular, the gas pressure regulator 130 can automatically control pressure inside the pressurization chamber 145, after being pressurized by the gas cylinder 187.

Also, in the second embodiment, the product discharge valve 171 of the housing includes both the product discharge channel 172 and a gas discharge channel 173 (see FIGS. 8-11). The gas discharge channel 173 is for example concentrically arranged with respect to the product discharge channel 172, and/or extends in parallel there-with. The gas inlet 170 for receiving gas is located near the discharge valve 171, and extends substantially in parallel therewith.

The present product discharge valve 171 is configured such that it provides both a closable product passage and a closable gas passage, from the product container 105 and first gas container 107 respectively, towards the top section of the apparatus.

An upstream section of the integrated gas discharge channel 173 (see FIG. 11) is in fluid communication with the integrated gas container 107, when the valve has been axially moved to its open valve state. The fluid communication between the upstream section of the of the gas discharge channel 173 and the first gas container 107 is closed when the valve 171 has moved (by spring force of the valve spring 174) to an initial, idle state (as in FIG. 10).

Further, in this embodiment, the arrangement of the gas discharge channel 173 and the product discharge channel 172 is such, that they serve as a flow timing control means, starting a supply of gas from the gas container 107 into the dispersion device 10 just before supply of product in the dispersion device 10. In particular, the discharge valve 171 is configured to have an intermediate valve position, between its idle state and its opened valve state (shown in FIGS. 10-11). In this intermediate valve state, the integrated gas discharge channel 173 has been brought in fluid communication with the integrated gas container 107, but the integrated product discharge channel 172 is still blocked from a respective product flow communication.

Upstream of the valve, within the top section 119 of the apparatus, there can be provided a product receiving section 151 (see FIG. 12), configured to receive and gas and product separately from the respective gas and product outlets of the valve 171. Also, the product receiving section 151 is configured to separately feed product and gas to the downstream dispersion device 110 (see FIG. 4, 13 as well). To that aim, the product receiving section 151 can include a product feed line 152 and a gas feed line 153. As follows from the drawing, in this embodiment, these feed lines 152, 153 extend substantially in parallel with each other, and substantially in parallel with a central axis of the housing H. One or more, for example each, of these feed lines 152, 153 can include further flow controlling means 152a, 153a, for example, flow rate control valves or pressure reduction means, as in the present example (see FIG. 12). The present dispersion device 110, configured to receive the product and gas from the receiving section 151, is arranged substantially perpendicularly with respect to a central axis of the housing, i.e. substantially normally with respect to the feed lines 152, 153, allowing a compact arrangement. During operation, the dispersion device 110 received gas and product, and injects the gas into the product, similar to the process described above with concerning the first embodiment (FIGS. 1-2).

Figure 13A:
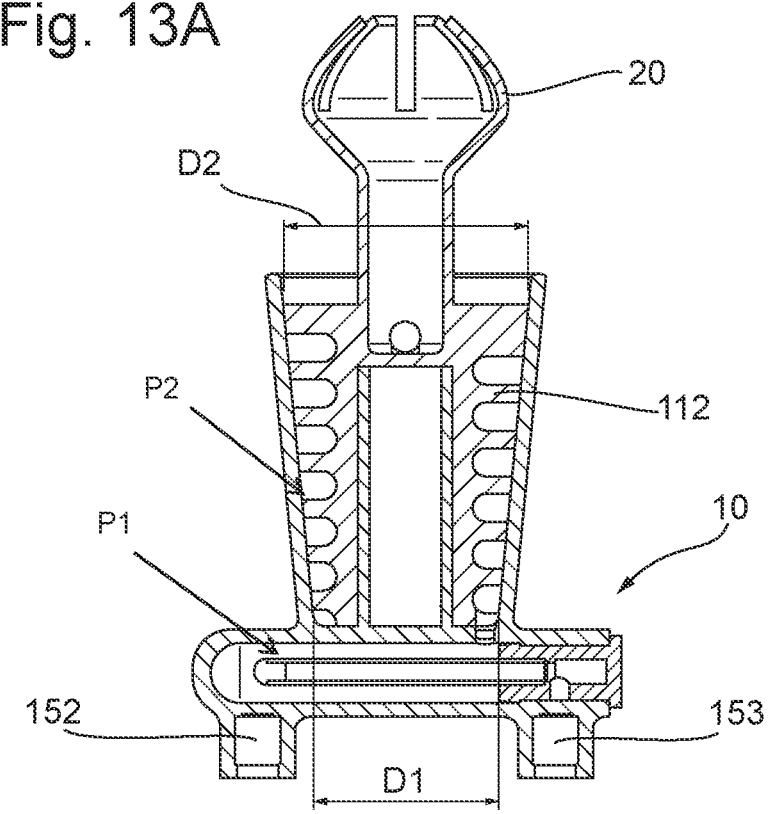
FIGS. 13A and 13B a nozzle section of the second embodiment, in cross-section and side view respectively.
Figure 13B:
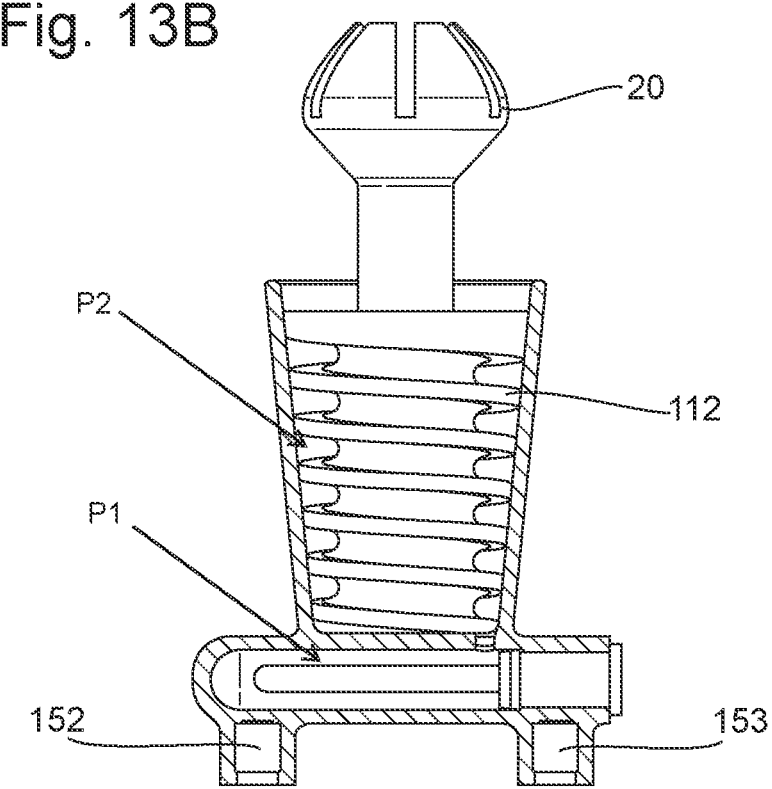

The dispersion device 110 has a product exit for passing foamed or foaming product into a downstream helical path of the processing device 112 (see FIG. 13A, 13B). In this example, a virtual center of the product processing path that is provided by the processing device 112 is substantially in parallel with a center axis of the housing H. In this example, the path is not only a helical (or spiral) path, it is also a path that has a gradually increasing cross-section, allowing better control of product processing, e.g. pressure reduction. This can be achieved in various ways. In this example, an external diameter of the helical path gradually increases from a first diameter D1 to a second diameter D2 (see FIG. 13A). An inner diameter of the helical path remains substantially constant; the same holds for a local width of the path (seen in cross-section, measured in parallel with the path's central axis of rotation). An alternative configuration of a product processing path e.g. does not have a gradually increasing cross-section, see for example the embodiment of FIG. 25.

Figure 25A:
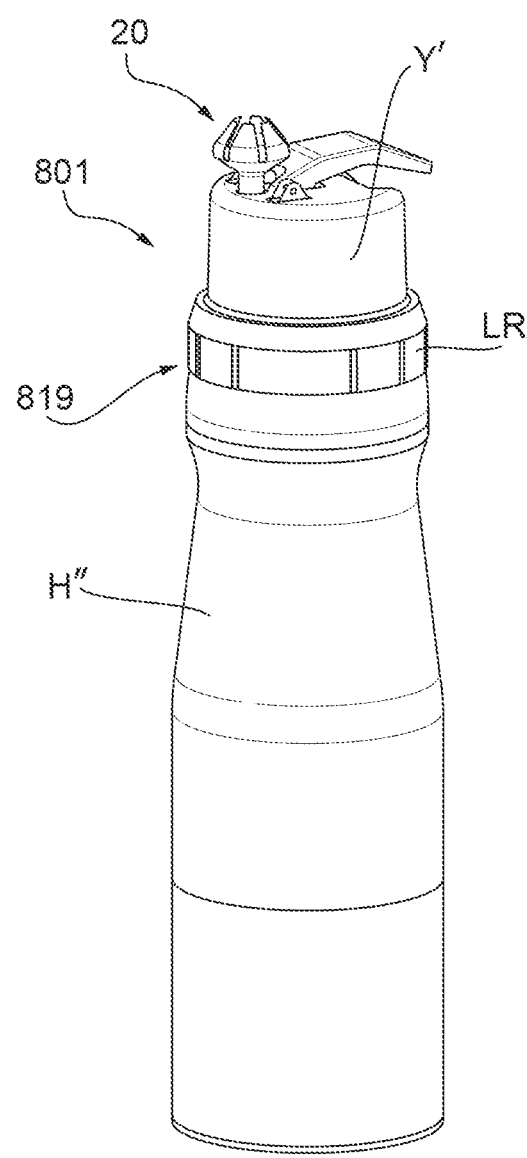
FIG. 25A a perspective side view of an eight embodiment of a dispensing apparatus.
Figure 25B:
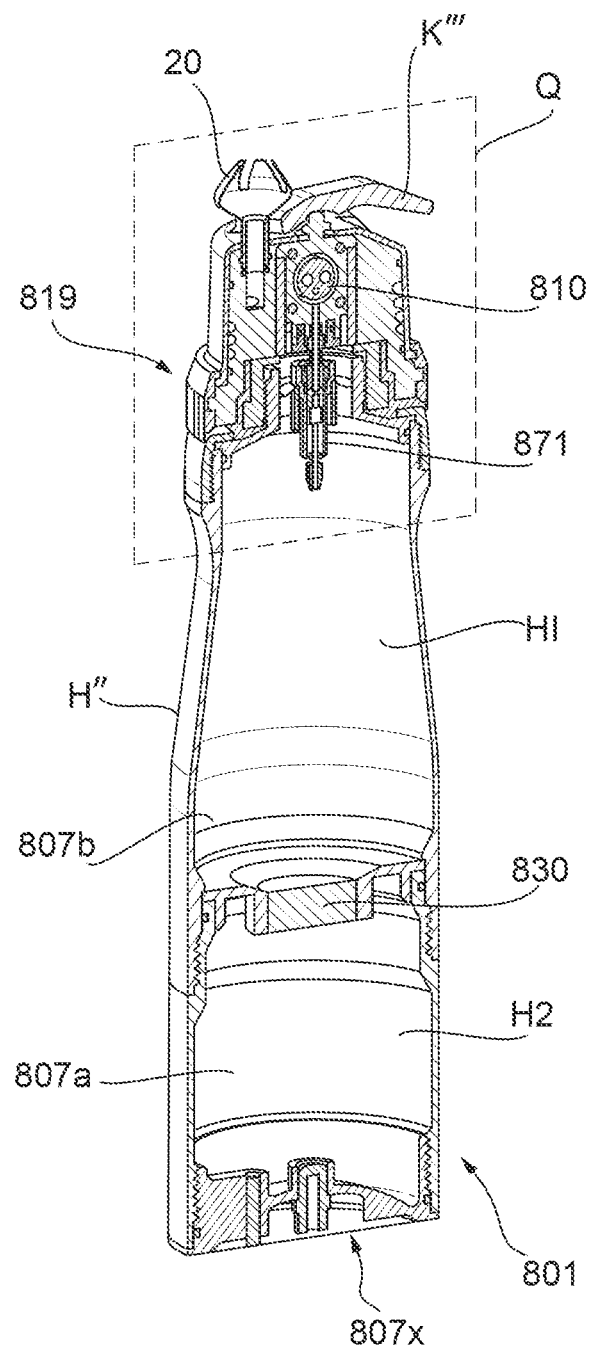
FIG. 25B a cross-section of FIG. 25A along a longitudinal center plane of the apparatus.
Figure 25C:
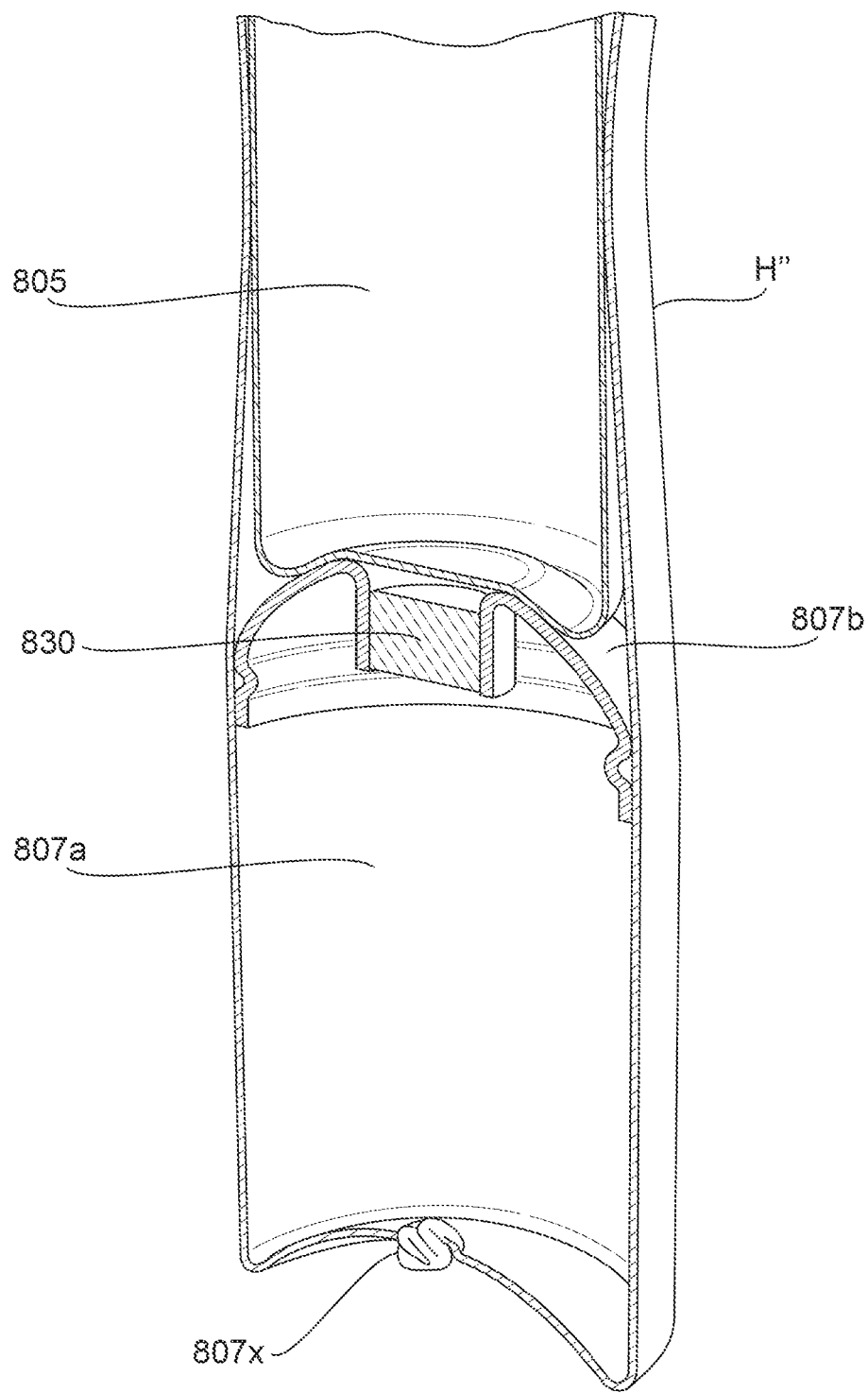
FIG. 25C part of a lower section of the eight embodiment, in perspective opened view.

Upstream the helical path ends into a downstream section of the dispensing head 20. The dispensing head 20 as such can be configured in various ways, as will be appreciated by the skilled person. For example, the dispensing head 20 and the processing device 112 can be made in one piece with one another, for example from plastic. Also, in a preferred embodiment, the dispensing head 20 and a respective processing device 112 can be releasable connected to the apparatus, for removal and separate cleansing thereof. FIGS. 25E-25F show an alternative embodiment, wherein a processing device 812 extends along an inner side of an external cap of the respective apparatus.

Finally, the apparatus includes a manual operating means K', for example a lever or handle, that is mechanically coupled to the discharge valve 171 for controlling (i.e. opening) that valve. In a non-limiting example, at least the product receiving section 151 can be mechanically linked to the operating means K', to be pressed axially downwardly thereby for actuation of the valve. The operating means K' can include spring-means themselves, for counteracting manual operation. Also, or in addition, a valve spring 174 can be configured to allow restoring positions of both the valve and operating means K', after manual release of the operating means.

Also, other components of the apparatus, e.g. the respective feed lines 152, 153, dispersion device 110, processing device 112 and dispensing head 20 can be linked to the operating means K', and can be movably or slidably arranged in the top section 110 of the apparatus for valve actuation. Alternatively, one or more components can allow movement via a flexible construction, for example, the intermediate gas and product feed lines 152, 153 can include flexible feed sections, for providing freedom of movement of an upstream section of the product receiving section 151 with respect to the downstream dispersion device 110.

Use of the second embodiment can encompass (see FIGS. 14A, 14B, 14C) a first step of removing or piercing an initial seal 143 of the pressurized gas container 187. As a result, gas is released from the container 187 and pressurizes the pressurization chamber 145 of the housing H, to a predetermined, controlled pressure. Also, as a result, both the product container 105 and first gas container 107 are pressurized.

Also, before initial use, an optional dispensing head cap 199, shielding the head 20 from an environment for storage etc., can be removed.

Next, the apparatus can be subsequently reoriented, for discharging foamed product P' in a substantially downwards direction, i.e. with a bottom B of the apparatus facing in a substantially upwards direction.

In order to start the discharge, the operating means K' can be manually actuated, e.g. pressed or shifted, thereby moving the valve 171 from an closed valve state via the intermediate valve state to the open valve state. As a result, the pressurized product container 105 and pressurized first gas container 107 discharge product P and gas via the valve and respective feed channels to the dispersion device 110, as is described above. After a proper foaming and product processing, by the dispersion device 110 and processing means 112, the foamed product P' leaves the dispensing head 20, optionally being shaped with e.g. a desired relief or the like During discharge, the product P follows a first path P1 through the dispersion device 110, namely a substantially straight path, and receives the first gas via the dispersion device. The product undergoes the controlled pressure reduction downstream of the dispersion device 110, and in this case follows a second path P2 during that controlled pressure reduction that substantially deviates from the first path P1 (the second path P2 being a helical path, in this example).

FIGS. 16-19 show a third embodiment, which differs from the second embodiment in that a single pressurized gas container 207 is included in the apparatus. Thus, the third embodiment follows the configuration that has been schematically shown in FIG. 1 regarding the first embodiment.

As follows from FIGS. 15A-15D, the third embodiment also includes a substantially cylindrical housing H', which can function as a durable holder (or primary packaging) for the other components of the apparatus 201. The apparatus also includes a (secondary) refill-unit SU, for example of a disposable configuration, that is insertable into the housing H', wherein the refill-unit includes product, gas, foaming means as well as the dispensing head 20 (as will be explained below). In this example, a removable cap Y is provided, that can be connected to a top of the housing H' via e.g. a screw-thread connection TD (as in this example) or bayonet coupling. As follows from FIGS. 15A-15C, assembly of the apparatus can include the steps of inserting the refill-unit SU into the housing H', and subsequently closing the housing by installing the cap Y thereon. In this case, the cap Y has a central opening, allowing passage of the dispensing head 20 of the refill-unit SU after assembly. The cap Y can also include a knob K" or similar actuation member, arranged for cooperation with valve activation means after assembly. Also, the cap Y can be provided with other means for operation of the apparatus, e.g. capsule seal piercing means and gas pressure reduction means, and a pressure chamber, as follows from FIGS. 17-18.

FIG. 16-19 show in more detail that the refill-unit SU may include an at least partly flexible product container 205 for holding the product P. Also, in this example, the refill-unit SU includes a number of gas containers 207, in particular a plurality (e.g. two or three as in this example) of pressurized gas cylinders. As in the above embodiments, each pressurized gas container can be a rigid (e.g. disposable) gas cartridge, being configured to withstand an internal gas pressure of at least 50 bar, e.g. at least 100 bar or even at least 200 bar, and preferably made of steel and preferably having a maximum internal volume of 200 ml, for a maximum example internal volume of 20 ml (e.g. 14 ml). Moreover, in the present third example, each of these gas cylinders is filled with a non-greenhouse gas, for example air or N2.

As in the above embodiments it is preferred that the gas containers 207 are sealed before initial use. In the present example, the cap Y of the apparatus includes i.e. provides an opening mechanisms 280 for opening the sealing structures 243 of the gas containers, during assembly of the cap Y onto the housing H' (see FIG. 18). Similar to the second embodiment, the opening mechanism can include a number of elements 291, that can move into respective piercing states (one shown in FIG. 19). In the present example, however, the piercing states are automatically reached during the mounting of the cap Y. The piercing elements 291 can receive gas from the content of the respective gas container 207, and can include integrated gas feed channels for passing the gas to a downstream pressure chamber 245 that is also integrated in the cap Y in this example (see FIG. 17B).

In this example, a first pressure regulator 230*a* is provided directly downstream each of the gas containers 207, for reducing or regulating pressure of gas that is fed into the pressure chamber 245. Also, a second pressure regulator 230*b* is provided, at a gas exit of the pressure chamber 245, for controlling pressure of gas that is fed from that chamber 245 to a downwards gas receiving inlet 270 of the refill-unit SU (see FIG. 16B).

In this example, the pressure chamber 245 and respective pressure regulators 230*a*, 230*b*, as well as the piercing elements 291 can be part of a cap insert unit that is rotational held within the surrounding cap Y. Thus, these elements can be positioned onto the refill unit SU during assembly, with e.g. the second pressure regulator 230*b* interconnecting with the gas receiving inlet 270 of the refill-unit SU, and the piercing elements 291 pointing towards gas cylinders to be opened. The respective positions can be upheld during a screwing movement M of the cap Y onto the holder H', wherein the axial movement of the cap Y presses the piercing elements 291 through the gas container seals (see FIG. 18).

The refill unit SU is configured to receive pressurized gas from the pressure chamber 245, via the respective gas inlet 270 after assembly. The gas pressurizes a second pressure chamber 246 to a predetermined pressure, set by the aforementioned regulator. This also leads to pressurizing the product container 205, which is located in the second pressure chamber 246 as is shown in the drawing.

The discharge valve 271 of the third embodiment is of similar construction as the discharge valve of the second embodiment, providing separate product and gas flow paths towards the downstream dispersion device 210. Similarly, the respective dispersion device 210 has a similar configuration as the above-described dispersion devices 10, 110. Besides, the processing device 212 of the third embodiment can have a similar configuration as the above-described processing devices 12, 112 of the other embodiments.

Also, the third embodiment can include a movable product receiving section 251, linked to the operating means K", the product receiving section being configured to be pressed axially downwardly by those operating means K" for actuation of the discharge valve. For example, the dispersion device 210, processing device 212 and dispensing head 20 can be components of that a product receiving section 251.

Figure 19:
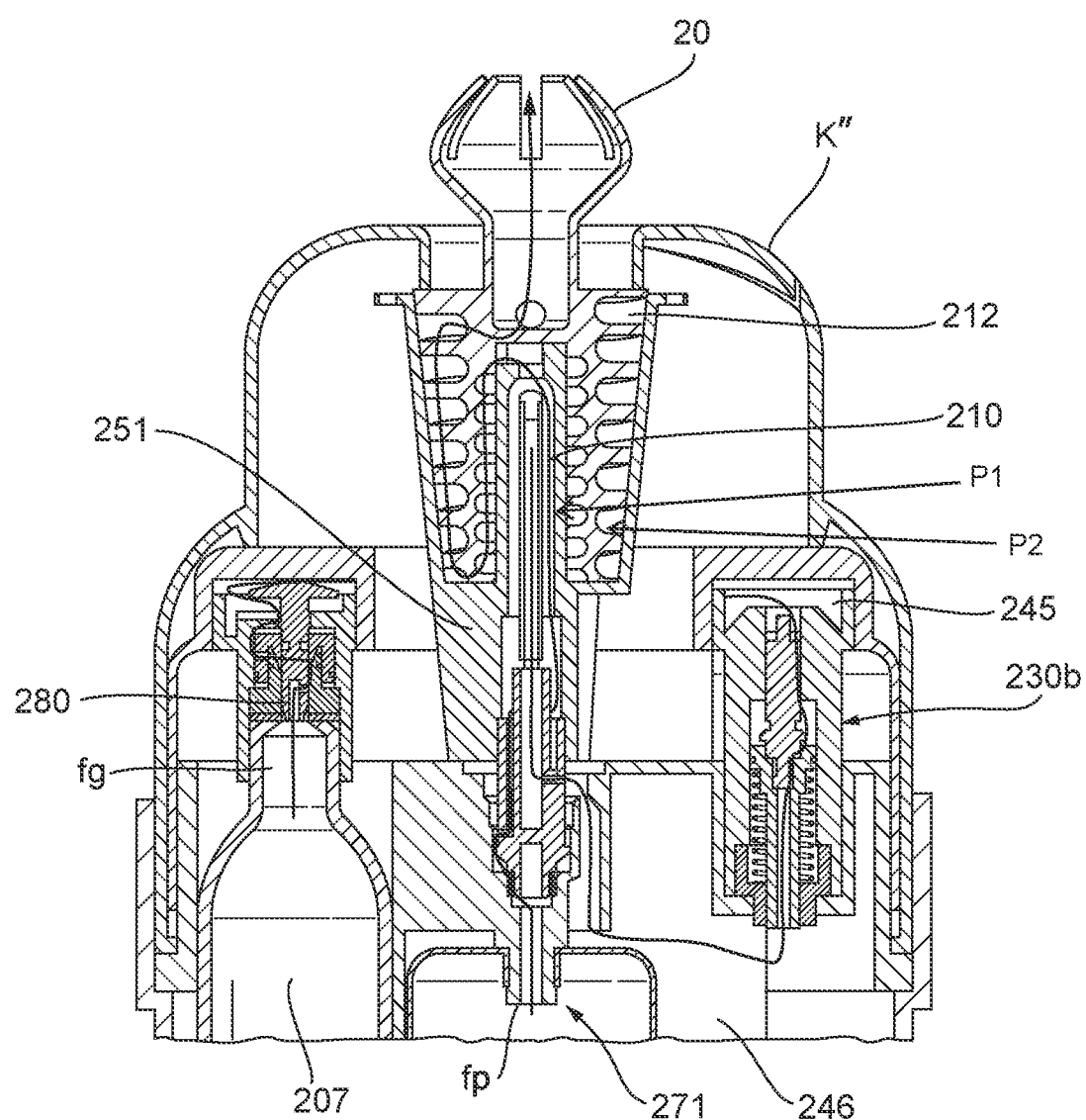
FIG. 19 view similar as FIG. 18, indicating flow during discharge.

In the third embodiment, the downstream dispersion device 210 is oriented substantially in parallel with a central axis of the apparatus, and is in particular located in line with the discharge valve 271 (see FIG. 19). Also, in the depicted relatively compact configuration, the dispersion device 210 reaches into the respective processing device 212. In this example the (elongated) dispersion device 210 is located for more than 50% within the respective processing device 212, and e.g. extends along a center line of that device 212.

As follows from FIG. 19, during operation (when the apparatus 201 is held in a position as shown e.g. in FIG. 15D), the operating means K" can be manually actuated, which leads to the opening of the discharge valve 271 and subsequent release of gas and product towards the dispersion device 210, and finally to the dispensing of the foamed product P'.

Various alternative configurations are possible, using one or more of the above-described innovative concepts.

Figure 20:
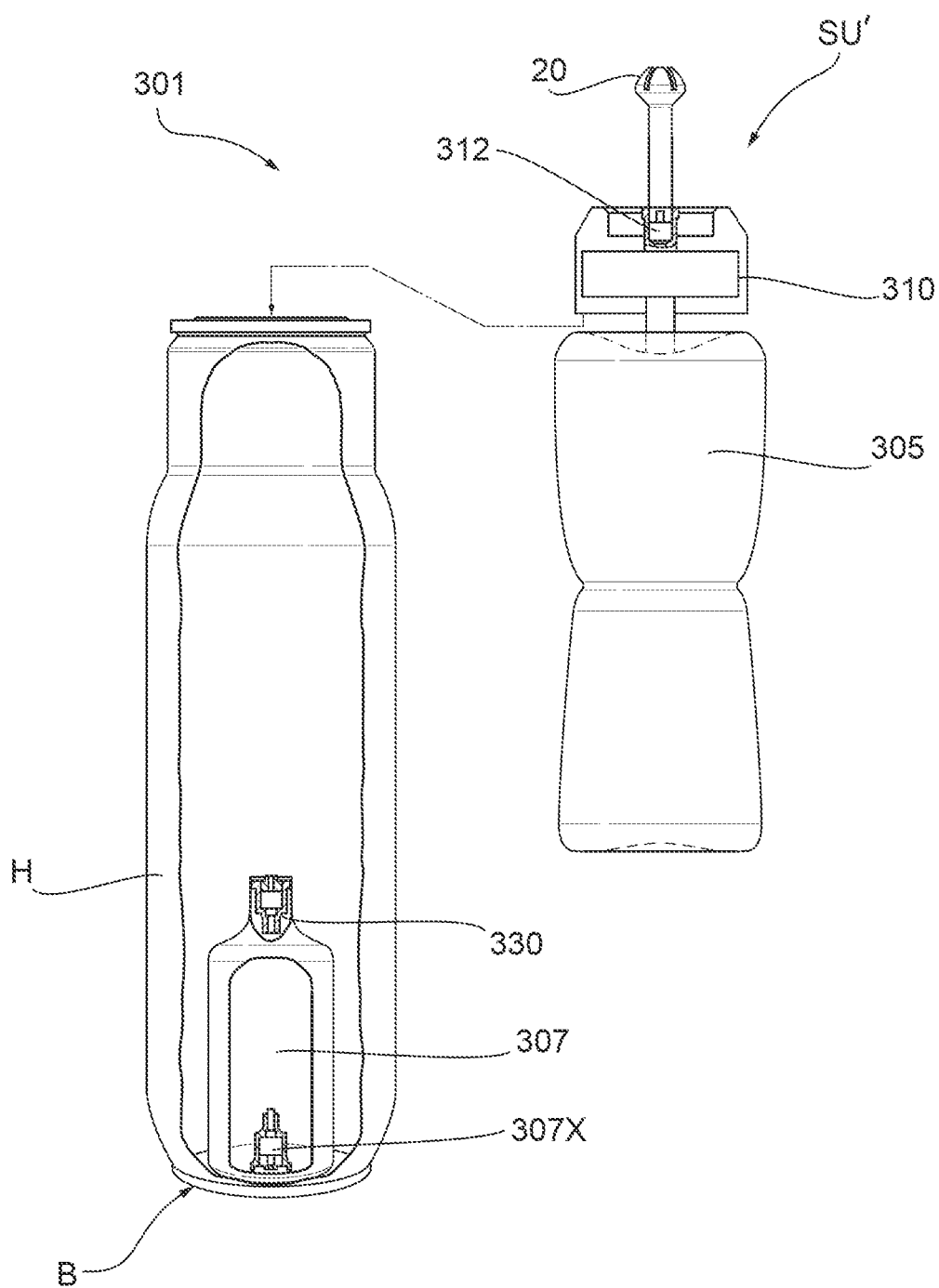
FIG. 20 schematically a fourth embodiment of a dispensing apparatus, partly opened and in partly disassembled state.

For example, as is shown in FIG. 20, the apparatus 301 can include a housing H, for example a durable can, configured to receive a removable (e.g. disposable) refill-unit SU' that includes an afore-mentioned dispersion device 310 and processing device 312, and a distal (downstream) dispensing head 20, a respective product discharge vale and manual operating means. Also, the present refill-unit SU' can include an at least partly flexible product holder 305. The refill unit SU' can be mounted onto a top rim or top section of the housing, e.g. a via screw thread connection or a clickable construction.

As follows from FIG. 20, the housing (in this case a bottom section thereof) includes an integrated, relatively small pressurized gas container 307, to be filled with pressurized non-greenhouse gas. The integrated gas container 307 includes a gas outlet having a pressure reducer 330, for feeding gas at a controlled, reduced pressure into a pressure chamber defined within the housing after assembly, for externally pressurizing the product container 305. The housing H includes a gas inlet return valve 307*x* for filling and pressuring the integrated gas container 307 before initial use. Filling and refilling, with respective assembly and potential disassembly, can be achieved e.g. in a production plant. A refilling can also e.g. include replacement of a used-up product container 305 by a freshly filled product container. Thus, the apparatus can provide good recyclability.

FIGS. 21A, 21B show one alternative example of a manually controllable seal opening mechanism 490. In this case, the mechanism 490 includes an activation ring that is mounted at an external side of the housing H (concentric there-with), wherein the ring can be manually rotated to push a respective piercing element (e.g. being movable with respect to a gas container locking member 444) to a respective pressurized gas container 487 of the apparatus. An external side of the ring 490 can be provided with grip enhancing means, for example a certain rough structure and/or a grip enhancing material. A mechanical coupling mechanism for transmission of ring rotation to piercing element movement is not shown in the drawing, the skilled person will appreciate that such a mechanism can be achieved in various different ways. For example, the activation ring 490 can be mounted using screw thread, such that rotation of the ring leads to axial displacement of the ring. This axial displacement can be mechanically transmitted to the piercing element via a suitable bridging part (not shown).

Figure 22:
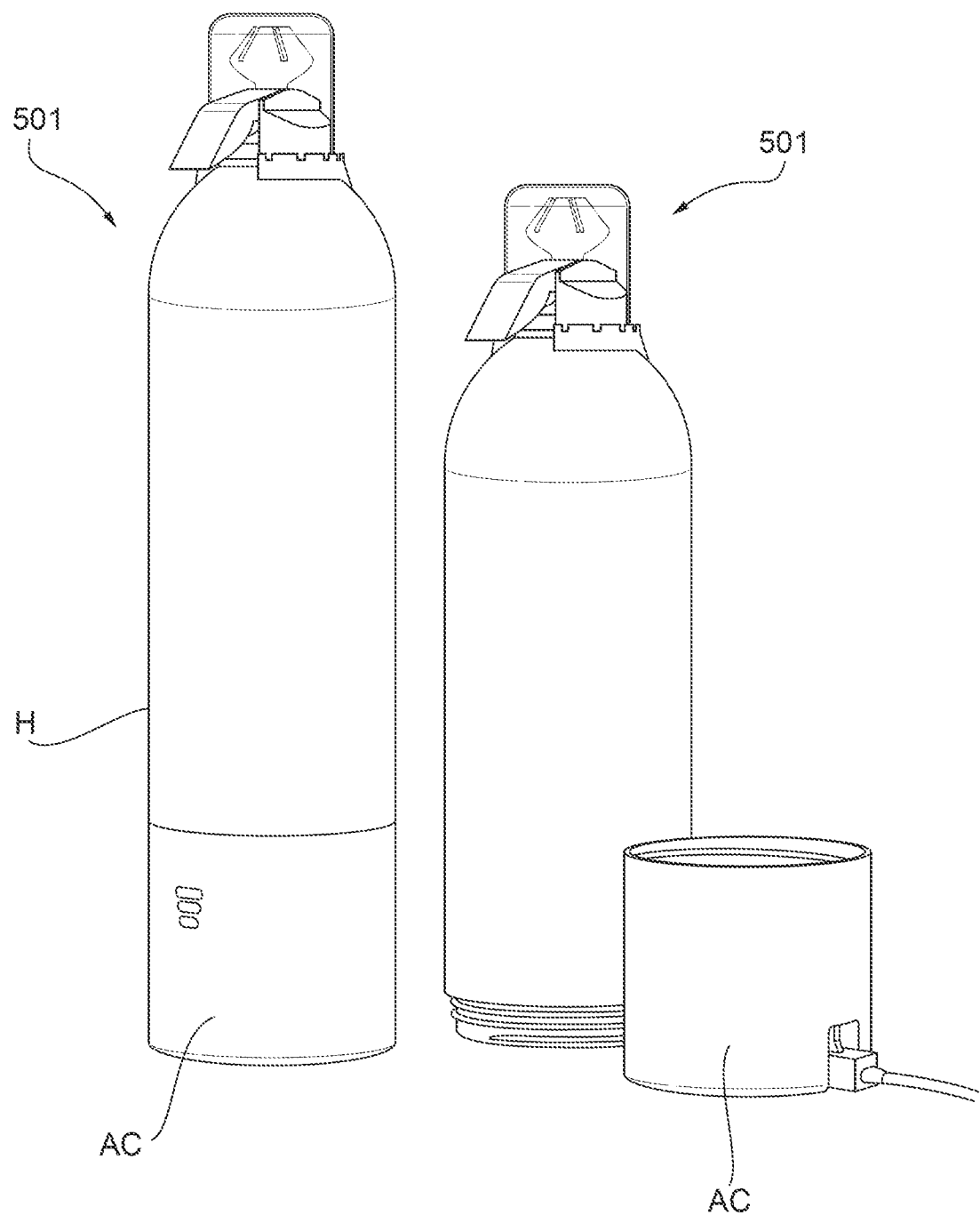
FIG. 22 a perspective side view of a sixth embodiment.

FIG. 22 shows another alternative example of embodiments 501 of the apparatus, that differs from the example shown in FIG. 20 in that the apparatus includes an integrated air compressor AC. The compressor can be e.g. recharged using an external charger. Also, the compressor can be configured to automatically pressurize an air pressurization chamber in the holder H, of be configured differently. In this example, the compressor section is removably connected to the holder H, e.g. via a screw-thread connection, allowing access to the air pressurization chamber (and e.g. a flexible product container present in that chamber).

Figure 23:
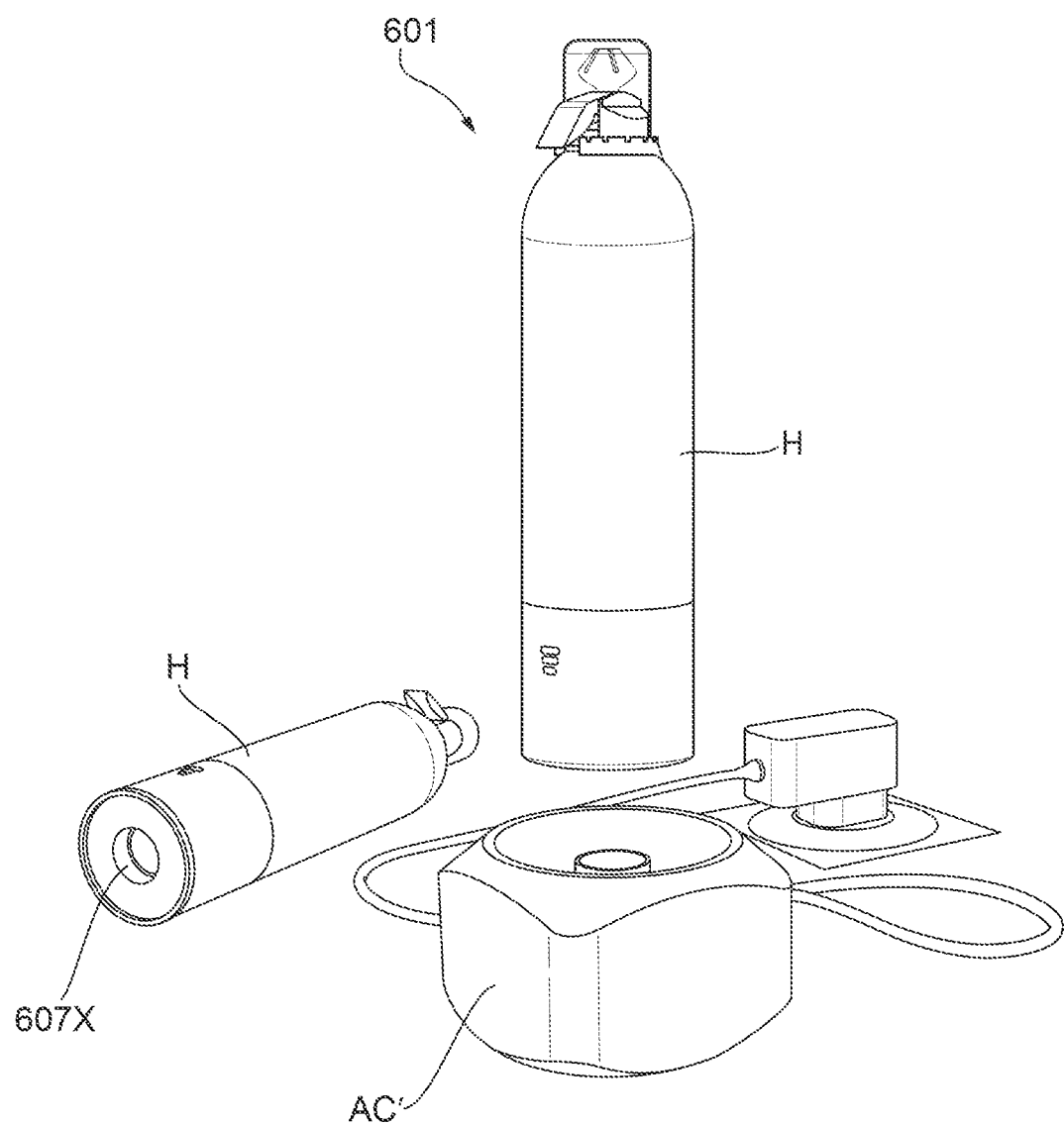
FIG. 23 a perspective side view of a seventh embodiment.

FIG. 23 shows yet another example 601, which differs from the embodiment shown in FIGS. 20 and 23 in that the apparatus includes an air charging station AC', having an air compressor, for feeding air into an integrated gas container of the holder (via a respective gas inlet 607$x$). The air compressor AC' and a bottom of the holder H preferably include locking means (e.g. a bayonet coupling or the-like) for mutually locking the two units during the charging of the integrated gas container. During operation, apparatus 601 can to cooperate with the external compressor AC', for charging or recharging the respective gas container.

Figure 24:
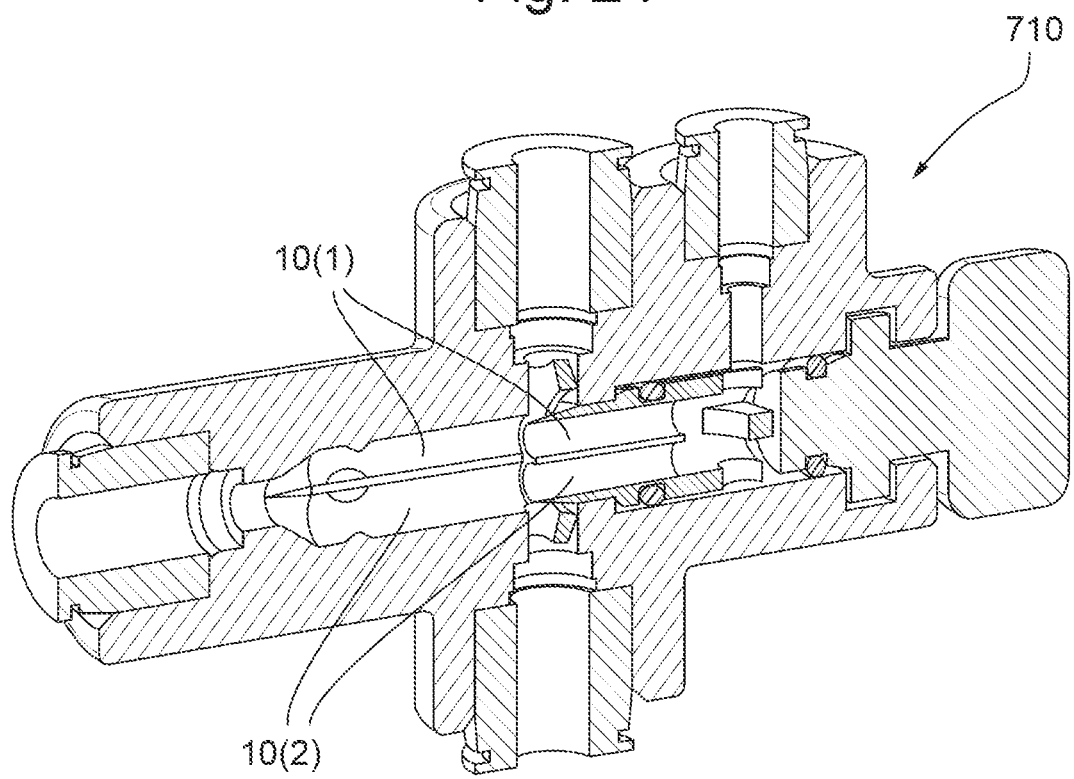
FIG. 24 shows a detail of a further embodiment of the a dispersion device, in perspective opened side view.

Referring to FIG. 24, a further embodiment of the apparatus (only the dispersion device part 710 being shown) can include at least two dispersion devices 10, each having a product entrance that is connectable to the product container 5 for receiving product P. In this case, the at least two dispersion devices 10 are further connectable to the gas container 7 for supplying the gas to the product P during product discharge. A similar configuration is implemented in the eight embodiment.

FIGS. 25A-25H show an eight embodiment 801 of a portable apparatus for dispensing (and foaming) of a product. The eight embodiment can provide a combination of some of the above-described embodiments. The eight embodiment can operate at a relatively low initial pressure of a respective integrated gas primary gas container 807$a$. Also, it preferably includes a stationary processing device 812 a having relatively large diameter, the processing device 812 preferably extending along an inner side of a removable cap. Another aspect of the eight embodiment provides an axially movable dispersion device 810 (extending between a manual operating means K''' and a discharge nozzle of the housing), the dispersion device 810 in particular being part of a slidable product receiving section 851 mechanically linking the valve 871 to the operating means K'''. The skilled person will appreciate that various aspects of the eight embodiment are not intrinsically linked to each other.

In particular, as follows from the drawing, a first section H1 of the housing H of the eight embodiment functions as a pressure chamber and includes a flexible product container 805 (see FIG. 25C). The product container contains the product that is to be foamed by and dispensed from the apparatus, similar to the embodiment shown in FIG. 20. Besides, the first section H1 of the housing H provides a secondary gas container 807$b$, for containing gas that is to be dispensed into the product. In particular, the secondary gas container 807$b$ is the space that is available in the housing's first section H1, external to the flexible product container 805.

Also, the housing H of the eight embodiment 801 includes a second section H2, providing a relatively large integrated gas container 807$a$, to be filled with gas. This integrated gas container 807$a$ acts as a primary gas container and includes a gas outlet having a pressure reducer 830 (see FIG. 25C), for feeding gas at a controlled, reduced pressure into the secondary gas container 807$b$, i.e. into the first section H1 of the housing (for pressurizing the secondary gas container 807$b$ to a working/operating pressure).

As follows from FIGS. 25B, 25C the interior volume of the second section H2 of the housing (i.e. of the primary gas container 807$a$) can take-up at least 20% of the total interior volume of the housing H, for example at least 30%. Similarly, the interior volume of the first section H1 of the housing (or of the flexible product container 805 when filled to a maximum before initial use) can take-up at least 30% of the total interior volume of the housing. In a further embodiment, a ratio of the interior volume of the first housing section H1 and the interior volume of the second housing section H2 (H1:H2) can be in the range of 1:3-3:1, more particularly the range of 1:2-2:1. In this example, it is preferred that the interior volume H1 for receiving the flexible product holder 805 is slightly larger than the interior volume of the respective primary gas container 807$a$. According to a non-limiting aspect, and e.g. depending on an overall interior volume of the housing, the volume of the primary gas container 807$a$ can be in the range of about 300-500 ml. The volume of a respective flexible product container 805 (in initially filled condition) can be e.g. in the range of about 400-600 ml.

By implementing a relatively large integrated primary gas container 807$a$, the gas container can be pressurized with sufficient gas to an initial pressure of at most 15 bar (and preferably at least 10 bar), for providing proper apparatus functioning during a long operating time. The pressure reducer 830 of the eight embodiment is configured to reduce the pressure of the gas from the second section H2, received from the primary gas container 807$a$, to a second predetermined lower pressure, for propelling product P out of the flexible product container 805 to the downstream dispersion device 810, and such that the product can pass the dispersion device 810, receiving gas from the dispersion device, to be discharged via the discharge nozzle 20 as a foamed product P'.

The eight embodiment 801 includes a gas inlet return valve 807$x$ for filling and pressuring the primary gas container 807$a$ before initial use. In this case, both gas container 807$a$, 807$b$ are preferably filled with air or nitrogen (N2), wherein CO2 and/or argon (or a mixture of the aforementioned gases) can be alternative options.

Figure 25D:
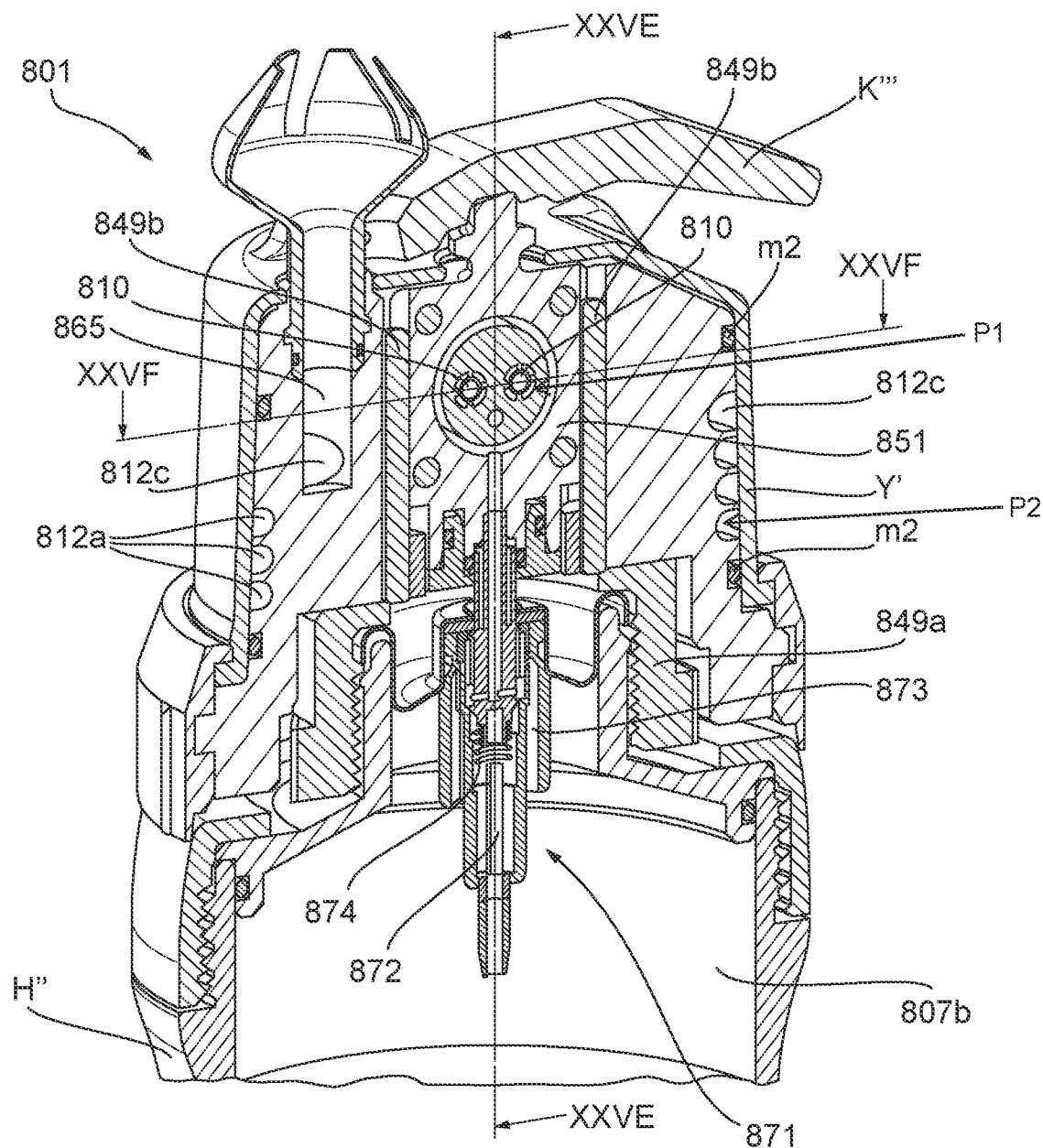
FIG. 25D a detail Q of FIG. 25B.
Figure 25E:
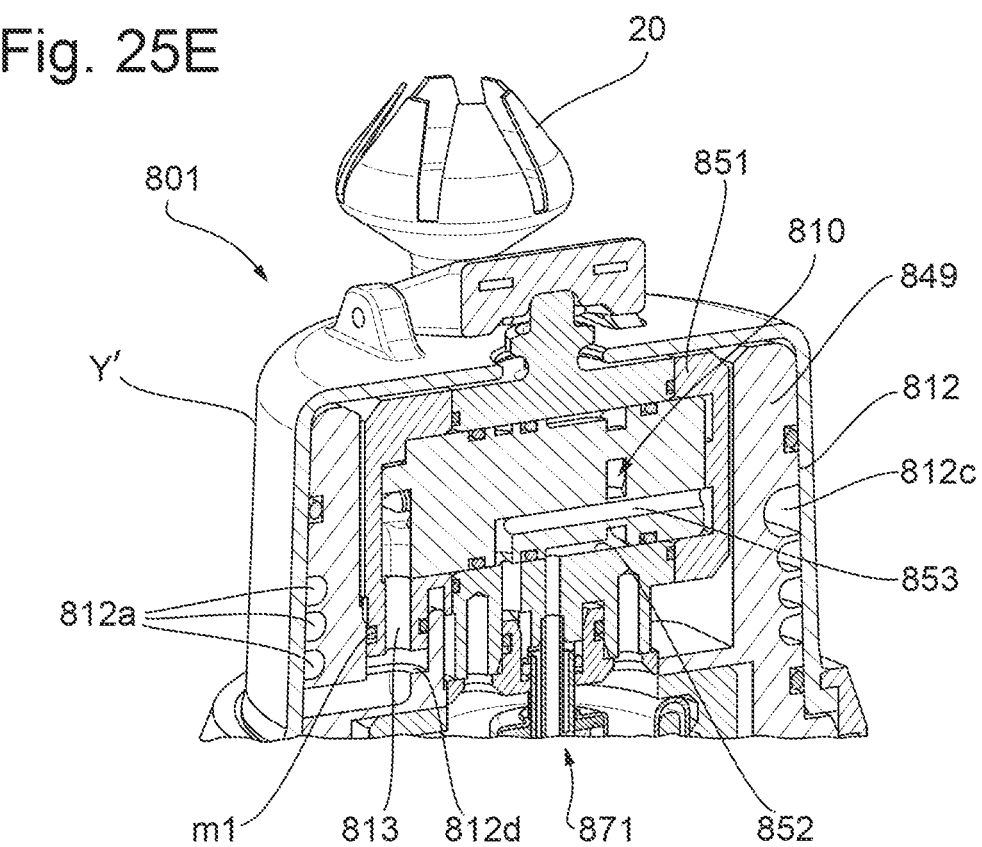
FIG. 25E a longitudinal cross-section of the apparatus part shown in 25D, along line XXVE-XXVE.
Figure 25F:
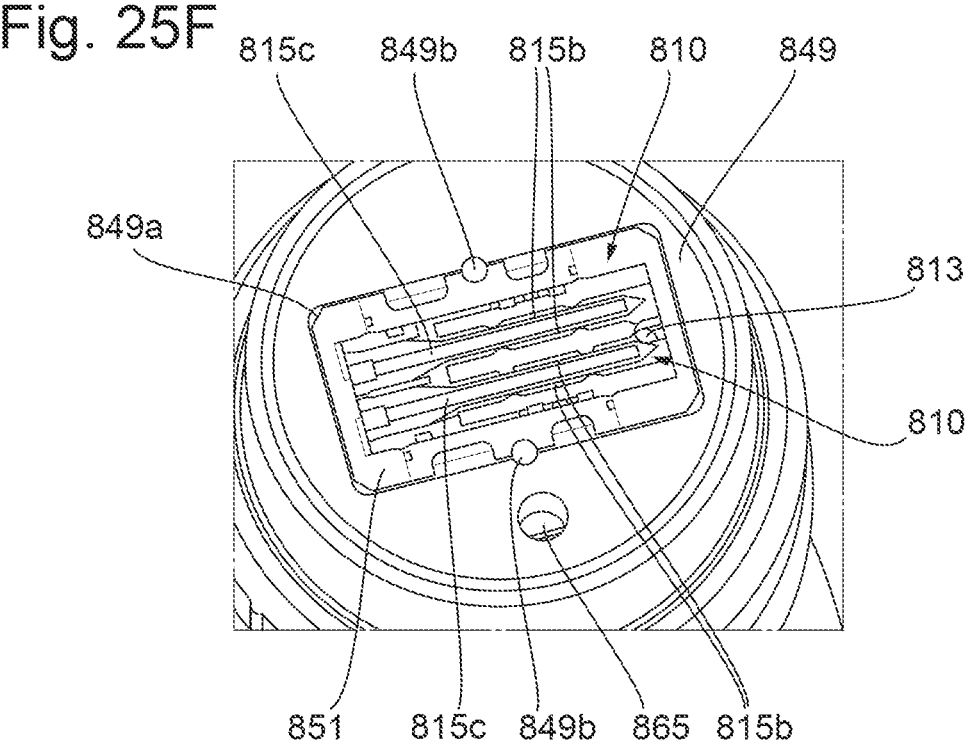
FIG. 25F a transversal cross-section of the apparatus part shown in 25D, along line XXVF-XXVF.

Referring to FIG. 25D (with does not depict the product container 805), the eight embodiment 801 has a discharge valve configuration of the dual-type, similar to the valve used in the embodiment shown in FIGS. 8-11. The product discharge valve 871 of the housing H includes both the product discharge channel 872 and a gas discharge channel 873 (see FIG. 25E). In the eight embodiment, the gas discharge channel 873 is for example concentrically arranged with respect to the product discharge channel 872, and/or extends in parallel there-with. During valve actuation, the gas discharge channel 873 feeds gas from the secondary gas container 807$b$ towards a downstream dispersion means 810.

Following from FIGS. 25D, 25E, 25F, the present embodiment has at least two dispersion devices 810 (two in this example), each having a gas discharge channel 815$c$ and respective product feed channel 815$b$, the dispersion devices 810 extending in parallel and being configured for simultaneous operation. The dispersion devices 810 and a respective downstream processing device 812 and discharge nozzle 20 as well as an operating means K''' are part of a top section 819 of the apparatus 801.

The eight embodiment does not require gas additional dedicated pressure regulator means, downstream of the gas discharge channel 873 of the valve 871. In this case, the gas (received from the secondary gas container 807$b$) is fed directly from that gas discharge channel 873, via a respective gas feed line 853, to the gas channels 815c of the gas dispersion devices 810. Similarly, a product feed line 852 is present in the top section 819 for feeding product from the product discharge valve 871 to the dispersion devices 810.

According to an aspect, the processing device 812 of the eight embodiment includes a plurality of loops providing a pressure reduction path for controlled pressure reduction of product, downstream of the dispersion devices 810. In this example, subsequent loops include circle sections 812a and intermediate loop bridging sections 812b (see FIG. 25H) for axially interconnecting the circle sections 812a. In this embodiment, a plurality of downstream circle sections 812a and respective bridging sections 812b have substantially constant path widths (viewed in both axial and radial directions). An upstream (final) circle section 812c, which terminates into a nozzle feed channel 865, has an enlarged path width with respect to the widths of the upstream circle section 812c (see FIG. 25E).

According to an aspect, the eight embodiment preferably includes a movable product receiving section 851, linked to the operating means K" after assembly. The product receiving section 851 is configured to be pressed axially downwardly by those operating means K" for actuation of the discharge valve (the downward movement e.g. being counteracted by a spring means 874 of the discharge valve). In this case, the dispersion devices 210 are components the product receiving section 851.

In this case, the apparatus includes a stationary guiding unit 849, mounted onto the container H". For example, the guiding unit 849 can be fixed or integrally include a coupling member 849a that is coupled or fixed to a top of the housing H". In the present embodiment (see FIG. 25D), the coupling member 849a of the guiding unit 849 is connected to a top of the housing via screw thread connection.

In this non-limiting example, the processing device 812 is part of the stationary guiding unit 849.

The guiding unit 849 slidingly holds the product receiving section 851. In particular, the guiding unit 849 includes a guiding space 849a for receiving the product receiving section 851. In this example, the apparatus includes a number of parallel guiding elements 849b, e.g. elongated guide bars, located along a longitudinal central plane and extending in axial direction (i.e. in parallel with the product valve 871), for axially positioning and guiding the product receiving section 851 with respect to the guiding unit 849.

According to an aspect, a (joint) product outlet 813 of the dispersion devices 210 extends in parallel with respect to the valve 871 of the housing and is in fluid-tight engagement with an upstream product entry chamber 812d of the processing device 812. In the example, to that aim, a first sealing means ml, e.g. a resilient O-ring, is located between an external side of the product outlet 813 and an inner side of the product entry chamber 812d. The arrangement is such that the product outlet 813 of the dispersion devices 210 is allowed to axially move with respect to the product entry chamber 812d of the processing device 812 during valve actuation.

In this example, the top section 819 of the apparatus 801 has a cap Y', similar to the embodiment shown in FIGS. 15A-15D. The present cap Y' defines (encloses) an outer side of a substantial part of the product flow paths of the processing device 812, a remaining part of the processing device being substantially provided by a respective groove structure in an opposite external side of the guiding unit 849 of the top section of the apparatus.

As follows from FIG. 25G, preferably, the cap Y' is removably connected to the guiding unit 849 of the top section of the apparatus, e.g. via a screw-thread connection or bayonet coupling, or a dedicated locking ring LR as in this example. The optional locking ring LR may include engagement members (e.g. locking cams, not shown) for engaging associated locking members (e.g. locking notches) of the guiding unit 849. The ring can be turned between a locking state to lock the cap Y' to the guiding unit 4429 (as in FIGS. 25A-25F) and a releasing state allowing removal of the cap Y' (as in FIG. 25G, 25H). The assembly further includes second sealing mean m2, e.g. two O-rings, for providing fluid-tight seals between the inner side of the cap Y' and the outer side of the guiding unit 849 at axial locations above and below the product path provided by the processing device 812 (see FIG. 25D, 25G, 25H).

Figure 25G:
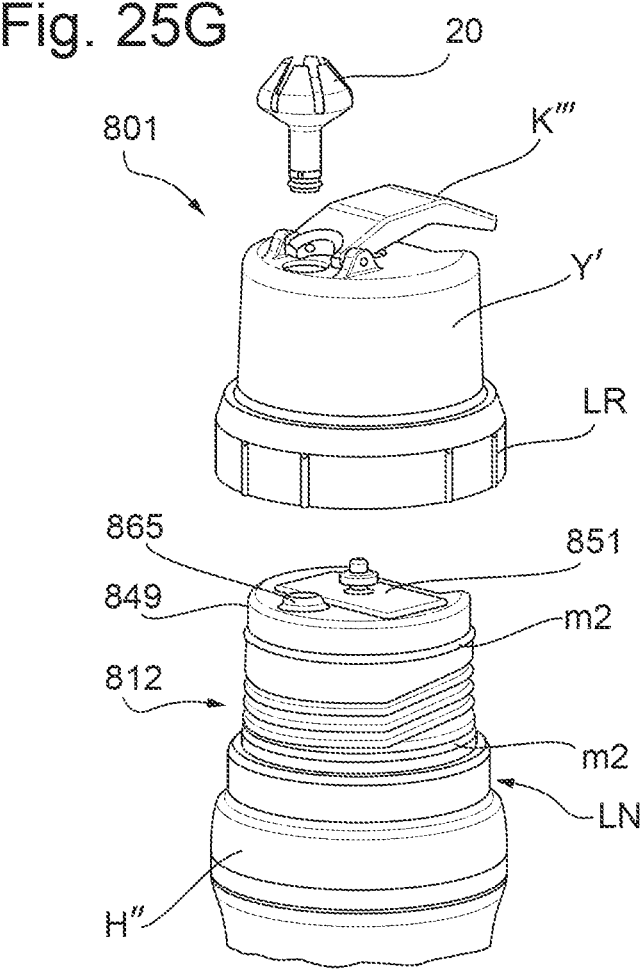
FIG. 25G a perspective view of a top section of the eight embodiment after partial disassembly.
Figure 25H:
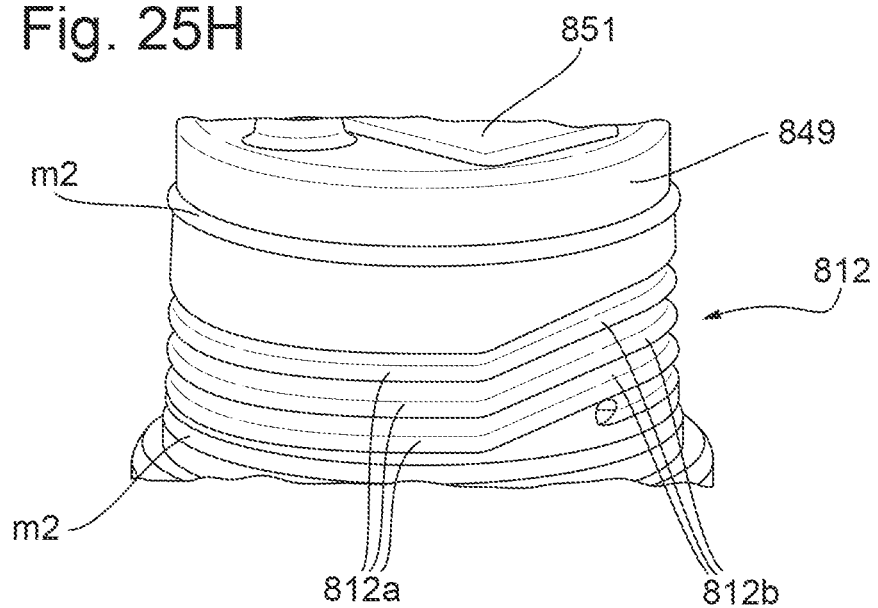
FIG. 25H a perspective side view of part of a processing device of the eight embodiment.

FIG. 25G also shows that the dispensing head 20 can be removably connected to the guiding unit 849, in particular to a respective nozzle feed channel 865 of the processing device 812.

The eight embodiment 801 can be operated at relatively low pressures in the primary gas container (e.g. lower than or at most 15 bar). Also, after use, the top section of the eight embodiment can be at least partially dismantled by removing the cap Y', allowing access to the product path along the processing device 812 for cleansing (e.g. rinsing) purposes, and allowing rinsing of the dispensing head 20. Herein, it is preferred that the product receiving section 851 can be removed from the guiding unit 849 after the cap Y' has been taken-off, for example to be temporarily disassembled (e.g. by taking out the processing devices 810) and rinsed as well. Also, the guiding structure of the eight embodiment, including the guiding unit 849 and product receiving section 851, allows for a stable and reliable operation of the apparatus.

Figure 26:
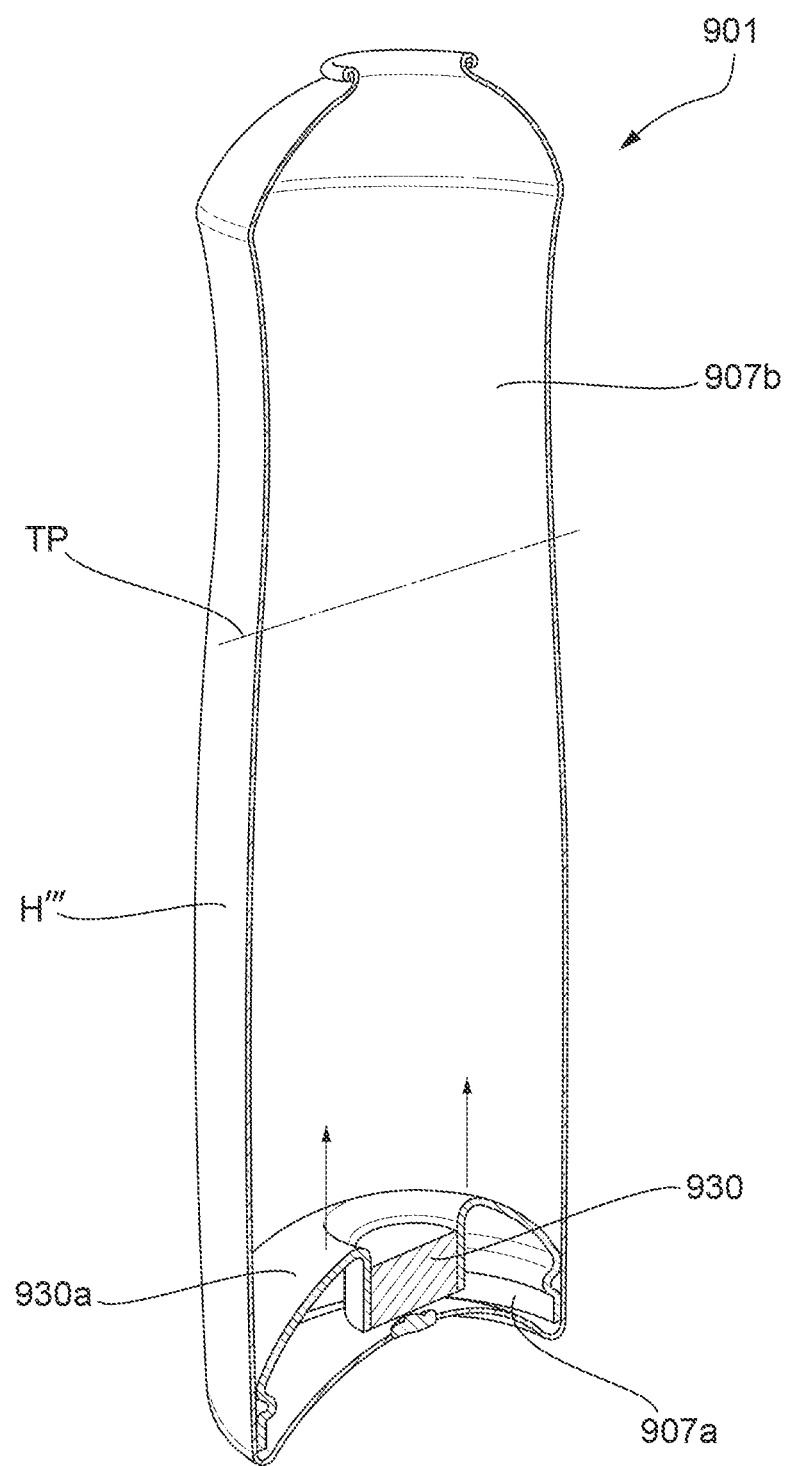
FIG. 26 a similar view as FIG. 25C, of a further alternative embodiment.

FIG. 26 schematically shows part of a ninth embodiment, which differs from the above embodiments (such as the eight embodiment) in that the housing H''' includes a primary integrated gas container 907a, to be filled with gas, wherein a volume of the primary integrated gas container 907a increases during the filling thereof.

In the ninth embodiment, the housing H''' includes a substantially cylindrical bottom section and a second section having a reduced width. FIG. 26 shows the example before the filling of the primary gas container 907a.

The primary gas container 907a and includes a gas outlet having a pressure reducer 930, for feeding gas at a controlled, reduced pressure into a secondary gas container 907b, i.e. into a first section of the housing (for pressurizing the secondary gas container 807b). In particular, the secondary gas container 807b is the space that is available in the housing's first section, next to the flexible product container 805 (located in the housing's first section as well). In this case, however, the primary and secondary gas containers 907a, 907b are separated by a wall 930a that includes the pressure reducer 930, which wall 930a is initially movable in axial direction. The present movable wall 930a acts as a piston, moving from an initial position upwardly (as indicated by arrows) along the cylindrical section of the housing during the filling of the primary gas container 907a (the filling being achieved via a respective inlet return-valve in the bottom of the housing), towards a blocked end location wherein the wall 930a engages and seals to the section of the housing having a reduced radial width (e.g. a inwardly tapered section of the housing).

After the movable partition wall of the pressure reducer 930 has moved to a final (blocked) position, the interior volume of the resulting second section of the housing (i.e. of the primary gas container 807a) can take-up at least 20% of the total interior volume of the housing H, for example at least 30%. Similarly, the interior volume of the resulting first section of the housing (or of the flexible product container when filled to a maximum before initial use) can take-up at least 30% of the total interior volume of the housing. As in the eight embodiment, e.g., the volume of the primary gas container 907a can be in the range of about 300-500 ml. The volume of a respective flexible product container can be in the range of 400-600 ml.

In this way, the housing can be manufactured from relatively little components and still provide a good separation between two internal gas compartments (allowing proper pressure control therein).

While specific embodiments have been described above, it will be appreciated that the invention may be practiced otherwise than as described. The descriptions above are intended to be illustrative, not limiting. Thus, it will be apparent to one skilled in the art that modifications may be made to the invention as described in the foregoing without departing from the scope of the claims set out below.

For example, an afore-mentioned processing device 12 can be arranged downstream of the dispersion devices 10 for performing a mixing treatment and/or pressure reduction on the product provided with the gas. A respective product dispensing head 20 can be arranged downstream of the processing device 12, the dispensing head 20 defining a said product receiving space 21 to receive the product P from the processing device 12. As follows from the drawing, the at least two dispersion devices are arranged for operating at the same time.

What is claimed is:

1. A method for foaming and dispensing a product, the method comprising:
    providing an apparatus, the apparatus comprising:
        a product container containing the product to be foamed by and dispensed from the apparatus;
        a gas container containing a gas;
        a dispersion device connectable to the product container and the gas container, the dispersion device comprising a first path; and
        a processing device disposed downstream from the dispersion device, the processing device comprising a second path;
    supplying, from the product container, the product to the dispersion device, the product to flow through the dispersion device via the first path; and
    supplying, from the gas container, the gas to the dispersion device, the product to receive the gas via the dispersion device; and
    performing, by the processing device, a controlled pressure reduction of the product provided with the gas, the product provided with the gas to follow the second path during the controlled pressure reduction, the second path deviates from the first path.

2. The method of claim 1, wherein the second path comprises at least one elongated channel.

3. The method of claim 2, wherein the elongated channel is at least one of: at least 1 cm in length, at least 10 cm in length, and at least 15 cm in length.

4. The method of claim 2, wherein the second path comprises a helical or spiral trajectory.

5. The method of claim 4, wherein the second path comprises a gradually increasing cross-section.

6. The method of claim 5, wherein an inner diameter of the second path remains constant and an external diameter of the second path gradually increases.

7. The method of claim 1, further comprising supplying the gas to the dispersion device before supplying the product to the dispersion device, the gas supplied via a gas flow control means and the product supplied by a product flow control means.

8. The method of claim 1, further comprising:
    inducing product flow via the gas from the gas container; and
    foaming the product via the gas from the gas container.

9. The method of claim 1, wherein the apparatus further comprises a pressurized gas supply means, the method further comprising:
    inducing, by the pressurized gas supply means, at least one of a gas flow or a product flow during operation, wherein an initial pressure in the pressurized gas supply means is greater than 15 bar.

10. The method of claim 9, wherein the gas container provides the pressurized gas supply means.

11. The method of claim 9, wherein the pressurized gas supply means is separate from the gas container.

12. The method of claim 1, wherein the apparatus further comprises a portable housing, the portable housing comprising a bottom facing away from a product dispensing head, the product dispensing head mounted to a top section of the apparatus.

13. The method of claim 12, wherein the housing comprises an elongated shape to be lifted single-handed by a user.

14. The method of claim 12, wherein the product container is integrated in the housing.

15. The method of claim 14, wherein the housing and respective product container have a disposable construction.

16. The method of claim 12, wherein the top section of the apparatus includes the dispersion device.

17. A portable apparatus for dispensing of a product, the apparatus comprising:
    a product container containing the product to be foamed by and dispensed from the apparatus;
    a gas container containing a gas;
    a dispersion device connectable to the product container and the gas container, the dispersion device comprising a first path, the product container to supply the product to the dispersion device, the gas container to provide the gas to the dispersion device, the product to receive the gas via the dispersion device, and the product to follow the first path through the dispersion device; and
    a processing device disposed downstream from the dispersion device, the processing device to perform a controlled pressure reduction of the product, the processing device comprising a second path that deviates from the first path, the product to follow the second path during the controlled pressure reduction; and
    a product dispensing head disposed downstream from the processing device, the product dispensing head to receive the product with the gas from the processing device.

18. The apparatus of claim 17, wherein the second path comprises at least one elongated channel.

19. The apparatus of claim 18, wherein the second path comprises a helical or spiral trajectory.

20. The apparatus of claim 19, wherein the second path comprises a gradually increasing cross-section, wherein an inner diameter of the second path remains constant and an external diameter of the second path gradually increases.

* * * * *